United States Patent
Gu et al.

(10) Patent No.: US 11,811,722 B2
(45) Date of Patent: *Nov. 7, 2023

(54) METHOD FOR PROCESSING CLOUD SERVICE IN CLOUD SYSTEM, APPARATUS, AND DEVICE

(71) Applicant: Huawei Cloud Computing Technologies Co., Ltd., Guizhou (CN)

(72) Inventors: Jiongjiong Gu, Shenzhen (CN); Xiaoyong Min, Gui'an (CN); Nannan Wang, Shenzhen (CN); Guoqiang Huang, Chengdu (CN); Rui Luo, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,039

(22) Filed: Aug. 9, 2022

(65) Prior Publication Data

US 2022/0382600 A1 Dec. 1, 2022

Related U.S. Application Data

(63) Continuation of application No. 17/197,128, filed on Mar. 10, 2021, now Pat. No. 11,431,670, which is a
(Continued)

(30) Foreign Application Priority Data

Sep. 11, 2018 (CN) .......................... 201811058816.4
Dec. 29, 2018 (CN) .......................... 201811644830.2

(51) Int. Cl.
*H04L 61/4511* (2022.01)
*G06F 16/958* (2019.01)
(Continued)

(52) U.S. Cl.
CPC ........ *H04L 61/4511* (2022.05); *G06F 9/5016* (2013.01); *G06F 9/5072* (2013.01);
(Continued)

(58) Field of Classification Search
CPC ............. H04L 61/4511; H04L 61/2503; H04L 63/0823; G06F 9/5016; G06F 9/5072; G06F 9/5077; G06F 9/541; G06F 16/958
See application file for complete search history.

(56) References Cited

U.S. PATENT DOCUMENTS 9,740,759 B1 *  8/2017  Zhang ................. G06F 16/1844
10,372,371 B2 *  8/2019  Gupta .................. G06F 3/0604
(Continued)

FOREIGN PATENT DOCUMENTS

| CN | 106559453 A | 4/2017 |
| CN | 107357660 A | 11/2017 |
| CN | 108259432 A | 7/2018 |

OTHER PUBLICATIONS

Bernstein, D., et al., "Intercloud Federation using via Semantic Resource Federation API and Dynamic SDN Provisioning," Jun. 11, 2015, 8 pages.
(Continued)

*Primary Examiner* — Cheikh T Ndiaye
(74) *Attorney, Agent, or Firm* — Conley Rose, P.C.

(57) ABSTRACT

A method for processing a cloud service in a cloud system, wherein the cloud system includes a hosted cloud, an allied cloud, and an alliance management apparatus, wherein the hosted cloud includes a first region, the allied cloud includes a second region, the hosted cloud further provides a virtual region for a user, and the virtual region is mapped by the second region on the hosted cloud. The alliance management apparatus enables a user of the hosted cloud to obtain unified experience when the user accesses the first region and the
(Continued)

virtual region in the cloud system, for example, unified experience in control interface access, and unified experience in application programming interface (API) access.

20 Claims, 20 Drawing Sheets

Related U.S. Application Data continuation of application No. PCT/CN2019/087947, filed on May 22, 2019.

(51) Int. Cl.
  *H04L 61/2503* (2022.01)
  *H04L 9/40* (2022.01)
  *G06F 9/50* (2006.01)
  *G06F 9/54* (2006.01)
(52) U.S. Cl.
  CPC ............ *G06F 9/5077* (2013.01); *G06F 9/541* (2013.01); *G06F 16/958* (2019.01); *H04L 61/2503* (2013.01); *H04L 63/0823* (2013.01)

(56) References Cited

U.S. PATENT DOCUMENTS

| | | |
|---|---|---|
| 10,904,068 B2 * | 1/2021 | Mittal .................. H04L 41/022 |
| 2014/0337954 A1 | 11/2014 | Ahmed et al. |
| 2018/0077138 A1 | 3/2018 | Bansal et al. |
| 2018/0219949 A1 * | 8/2018 | Lee ......................... H04L 67/34 |

OTHER PUBLICATIONS

Margheri, A., et al., "A Distributed Infrastructure for Democratic Cloud Federations," 2017, IEEE 10th International Conference on Cloud Computing (CLOUD), 4 pages.

Wang, Y., et al., "Dynamic Resource Arrangement and Revenue Management Based on Cloud Federation," School of Software, Shanghai Jiao Tong University, Oct. 18, 2012, with an English abstract, 69 pages.

Huang, J., "OpenStack Cascading solution," Last update Jul. 6, 2015 ,https://wiki.openstack.org/wiki/OpenStack_cascading_solution, 8 pages.

* cited by examiner

METHOD FOR PROCESSING CLOUD SERVICE IN CLOUD SYSTEM, APPARATUS, AND DEVICE

CROSS-REFERENCE TO RELATED APPLICATIONS

This a continuation of U.S. patent application Ser. No. 17/197,128 filed on Mar. 10, 2021, which is a continuation of International Patent Application No. PCT/CN2019/087947 filed on May 22, 2019, which claims priority to Chinese Patent Application No. 201811644830.2 filed on Dec. 29, 2018, and Chinese Patent Application No. 201811058816.4 filed on Sep. 11, 2018. All of the aforementioned patent applications are hereby incorporated by reference in their entireties.

TECHNICAL FIELD

This application relates to the field of cloud computing, and in particular, to a method for processing a cloud service in a cloud system, an apparatus, and a device.

BACKGROUND

Cloud computing is a new internet-based computing and service mode, and uses an internet technology to aggregate large and scalable information technology (IT) capabilities (namely, resources such as computing, storage, and network resources) to be provided for a user as a service. At present, with development of cloud computing, an increasing quantity of cloud service providers at home and abroad begin to provide cloud services for the user, and these cloud services include an infrastructure as a service, a platform as a service, software as a service, and the like. Because the cloud service providers each have their respective geographical service coverage areas and service features, when the user needs to use a cloud service across countries/regions, the user may use services of different clouds across clouds, and need to process a plurality of different accounts and bills, and different application programming interfaces (APIs). This brings inconvenience to the user using the cloud service, and also brings difficulties to the cloud service providers providing global services. How to centrally manage resources of a plurality of cloud platforms to resolve a problem of unified operation and maintenance, so that the user perceives no difference when using a cloud service across clouds becomes an important problem to be currently resolved by the cloud service providers for promoting cloud services.

SUMMARY

This application provides a method for processing a cloud service in a cloud system. The method enables a user to access a region of each allied cloud in a cloud federation by using a hosted cloud, thereby improving use efficiency of the cloud federation and experience of the user in using the cloud federation.

According to a first aspect, this application provides a method for processing a cloud service in a cloud system, where the method is performed by a computing device system. In the method, the cloud system includes a hosted cloud, an allied cloud, and an alliance management apparatus, the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped by the second region in the hosted cloud. The method includes receiving, by the alliance management apparatus, an API request sent by a client of the user, where the API request is used to request to process a cloud service in the virtual region, replacing, by the alliance management apparatus, an API endpoint domain name of the virtual region that is carried in the API request with an API endpoint domain name of the second region, to obtain an API request obtained after the replacement, and forwarding, by the alliance management apparatus, the API request obtained after the replacement to an API endpoint of the second region, where the API request obtained after the replacement is used to request to process the cloud service in the second region.

Optionally, the hosted cloud and the allied cloud are provided by different cloud service providers.

Optionally, the virtual region does not occupy a hardware resource and a software resource of the hosted cloud.

Optionally, according to the first aspect, a method for processing a request for accessing a cloud federation is further provided. The cloud federation includes a hosted cloud, an allied cloud, and an alliance management apparatus, the hosted cloud provides a first cloud service for a user based on a hardware resource and a software resource that are of a region of the hosted cloud, and the allied cloud provides a second cloud service for the user based on a hardware resource and a software resource that are of a region of the allied cloud. The method includes receiving, by the alliance management module, an API request sent by a client of the user, where the API request is used to request to process the second cloud service in a virtual region of the hosted cloud, and the virtual region of the hosted cloud is mapped by the region of the allied cloud in the hosted cloud, replacing, by the alliance management module, a first API endpoint domain name carried in the API request with a second API endpoint domain name, where the first API endpoint corresponds to the virtual region of the hosted cloud, and the second API endpoint corresponds to the region of the allied cloud, and forwarding, by the API agent, an API request obtained after the replacement to the first API endpoint of the allied cloud.

Optionally, according to the first aspect, a method for processing a request for accessing a cloud federation is further provided. The cloud federation includes a hosted cloud and an allied cloud, the hosted cloud and the allied cloud respectively provide a first cloud service for a first user that registers an account with the hosted cloud and a second cloud service for a second user that registers an account with the allied cloud, the hosted cloud provides the first cloud service based on a hardware resource and a software resource that are of a region of the hosted cloud, and the allied cloud provides the second cloud service based on a hardware resource and a software resource that are of a region of the allied cloud. The method includes receiving an API request sent by a client of the first user, where the API request is used to request to process the second cloud service of the region of the allied cloud, replacing a target API endpoint domain name in the API request with an API endpoint domain name of the region of the allied cloud, and forwarding, based on the API endpoint domain name of the region of the allied cloud, an API request obtained after the replacement to an API endpoint that is provided by the allied cloud for the second user.

In a possible implementation of the first aspect, the API endpoint domain name of the virtual region corresponds to an Internet Protocol (IP) address of the alliance management apparatus in a Domain Name System (DNS).

Optionally, the IP address of the alliance management apparatus indicates an IP address of a module that is included in the alliance management apparatus. For example, the alliance management apparatus includes an API agent, and the API endpoint domain name of the virtual region actually corresponds to an IP address of the API agent in the DNS.

In a possible implementation of the first aspect, the replacing, by the alliance management apparatus, an API endpoint domain name of the virtual region that is carried in the API request with an API endpoint domain name of the second region includes querying, by the alliance management apparatus, configuration information based on the API endpoint domain name of the virtual region, to obtain the API endpoint domain name of the second region, where the configuration information records a correspondence between an API endpoint domain name of the virtual region and an API endpoint domain name of the second region, and replacing, by the alliance management apparatus, the API endpoint domain name of the virtual region that is carried in the API request based on the obtained API endpoint domain name of the second region. The configuration information may be a relationship table.

In a possible implementation of the first aspect, the replacing, by the alliance management apparatus, an API endpoint domain name of the virtual region that is carried in the API request with an API endpoint domain name of the second region includes converting, by the alliance management apparatus, the API endpoint domain name of the virtual region into the API endpoint domain name of the second region based on a pre-configured domain name rule.

In a possible implementation of the first aspect, the domain name rule includes a correspondence between a region identifier included in the API endpoint domain name of the virtual region and a region identifier included in the API endpoint domain name of the second region.

In a possible implementation of the first aspect, the domain name rule includes a correspondence between a cloud identifier included in the API endpoint domain name of the virtual region and a cloud identifier included in the API endpoint domain name of the second region.

In a possible implementation of the first aspect, the alliance management apparatus receives an API response sent by the API endpoint of the second region based on the API request, where the API response includes information about the processed cloud service, replaces the API endpoint domain name of the second region in the API response with the API endpoint domain name of the virtual region, to obtain an API response obtained after the replacement, and returns the API response obtained after the replacement to the client.

Before replacing the API endpoint domain name of the second region in the API response with the API endpoint domain name of the virtual region, the alliance management apparatus may obtain the API endpoint domain name of the virtual region by querying the configuration information, or may perform the replacement based on the pre-configured domain name rule. The API endpoint domain name of the second region in the API response is replaced with the API endpoint domain name of the virtual region, so that an API response received by the user at the client has a same style as an API response sent by an API endpoint of the hosted cloud based on the API request, and the user has same experience in processing the cloud service in the virtual region of the hosted cloud by using the API request and processing the cloud service in the first region of the hosted cloud.

In a possible implementation of the first aspect, before the alliance management apparatus receives the API request sent by the client, the method further includes receiving, by the alliance management apparatus, an account name and a password of the user that are sent by the client, obtaining, by the alliance management apparatus, a first authentication token of the user from the hosted cloud based on the account name and the password of the user, determining, by the alliance management apparatus based on the first authentication token of the user, that the user has permission to process a cloud service of the second region, obtaining, by the alliance management apparatus, a second authentication token of the user from the allied cloud, and sending, by the alliance management apparatus, the second authentication token to the client, where the API request carries the second authentication token.

In a possible implementation of the first aspect, the API request further carries key information of the user, and the method further includes obtaining, by the alliance management apparatus, a first authentication token of the user from the hosted cloud based on the key information of the user, determining, by the alliance management apparatus based on the first authentication token of the user, that the user has permission to process a cloud service of the second region, obtaining, by the alliance management apparatus, a second authentication token of the user from the allied cloud, and adding, by the alliance management apparatus, the second authentication token of the user to the API request obtained after the replacement.

In a possible implementation of the first aspect, the key information of the user includes an access key (AK) and a signature that is calculated by using an AK/secret access key (SK) with a signature algorithm, and the obtaining a second authentication token of the user includes decrypting the signature by using the signature algorithm, to obtain the second authentication token of the first user based on key information obtained after the decryption. Signature encryption and signature decryption are performed on the key information, thereby improving security of the cloud system.

In a possible implementation of the first aspect, the API request includes a request unified resource locator (URL) and a request parameter, where the request URL includes a target API endpoint domain name, a response to the request includes a request source address, a response parameter, and a response resource link, the request source address indicates an address to which the API response needs to be returned, the response parameter indicates a result or an indication of the API request, and the response resource link indicates an address of a response resource.

According to a second aspect, this application provides a method for processing a cloud service in a cloud system, where the method is performed by a computing device system. In the method, the cloud system includes a hosted cloud, an allied cloud, and an alliance management apparatus, the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped by the second region in the hosted cloud. The method includes receiving, by the alliance management apparatus, a control interface request sent by a client of the user, where the control interface request is used to request a control interface of the virtual region, generating a page static file request and a cloud service information request based on the control interface request, obtaining, based on the page static file request, a page static file response provided by the hosted cloud, obtaining, based on the cloud service information request, a cloud service information response provided by the allied cloud, generating a control interface response based on the page static file response and the cloud service information response, and sending the control interface response to the client.

Optionally, the hosted cloud and the allied cloud are provided by different cloud service providers.

Optionally, the virtual region does not occupy a hardware resource and a software resource of the hosted cloud.

In a possible implementation of the second aspect, the control interface request includes a control interface domain name of the virtual region, and the generating, by the alliance management apparatus, a cloud service information request based on the control interface request includes obtaining, by the alliance management apparatus, a control interface domain name of the second region based on the control interface domain name of the virtual region, and generating, by the alliance management apparatus, the cloud service information request based on the control interface domain name of the second region.

In a possible implementation of the second aspect, the control interface domain name of the virtual region corresponds to an IP address of the alliance management apparatus in a DNS.

Optionally, the IP address of the alliance management apparatus indicates an IP address of a module that is included in the alliance management apparatus. For example, the alliance management apparatus includes a control interface agent, and the control interface domain name of the virtual region actually corresponds to an IP address of the control interface agent in the DNS.

In a possible implementation of the second aspect, the obtaining, by the alliance management apparatus, a control interface domain name of the second region based on the control interface domain name of the virtual region includes querying, by the alliance management apparatus, configuration information based on the control interface domain name of the virtual region, to obtain the control interface domain name of the second region, where the configuration information records a correspondence between a control interface domain name of the virtual region and a control interface domain name of the second region. The configuration information may be a relationship table.

In a possible implementation of the second aspect, the obtaining, by the alliance management apparatus, a control interface domain name of the second region based on the control interface domain name of the virtual region includes converting, by the alliance management apparatus, the control interface domain name of the virtual region into the control interface domain name of the second region based on a pre-configured domain name rule.

In a possible implementation of the second aspect, the domain name rule includes a correspondence between a region identifier included in the control interface domain name of the virtual region and a region identifier included in the control interface domain name of the second region.

In a possible implementation of the second aspect, the domain name rule includes a correspondence between a cloud identifier included in the control interface domain name of the virtual region and a cloud identifier included in the control interface domain name of the second region.

In a possible implementation of the second aspect, the generating, by the alliance management apparatus, a control interface response based on the page static file response and the cloud service information response includes receiving, by the alliance management apparatus, the cloud service information response, where the cloud service information response includes the control interface domain name of the second region and the cloud service information, replacing, by the alliance management apparatus, the control interface domain name of the second region that is included in the cloud service information response with the control interface domain name of the virtual region, and generating, by the alliance management apparatus, the control interface response based on the page static file response and a cloud service information response obtained after the replacement.

In a possible implementation of the second aspect, a page static file provided by the hosted cloud may be obtained by the alliance management apparatus in advance and buffered. The page static file provided by the hosted cloud is obtained in advance, thereby improving efficiency of processing a cloud service, and reducing a waiting time before the user obtains the control interface response.

In a possible implementation of the second aspect, the control interface domain name of the virtual region of the hosted cloud is generated by the hosted cloud in a pre-configuration phase based on a domain name of the second region of the allied cloud, and the control interface domain name of the virtual region of the hosted cloud is in a one-to-one correspondence with the domain name of the second region of the allied cloud.

According to the method provided in the second aspect, when accessing the virtual region, the user obtains a control interface response having a same style as a control interface response obtained when accessing the first region of the hosted cloud.

According to a third aspect, this application provides a method for providing a control interface of a cloud system, where the method is performed by a computing device system. In the method, the cloud system includes a hosted cloud, an allied cloud, and an alliance management apparatus, the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped by the second region in the hosted cloud. The method includes providing, by the hosted cloud, a management interface of the hosted cloud for a client of the user, where the management interface of the hosted cloud includes a region selection subinterface, and the region selection subinterface includes an element of the first region and an element of the virtual region, receiving, by the hosted cloud, a first control interface request sent by the client, where the first control interface request is generated when the user selects the element of the first region, providing, by the hosted cloud, a control interface of the first region for the client based on the first control interface request, where the control interface of the first region presents information about a cloud service of the first region, receiving, by the alliance management apparatus, a second control interface request sent by the client, where the control interface request is generated when the user selects the element of the virtual region, and providing, by the alliance management apparatus, a control interface of the virtual region for the client based on the second control interface request, where the control interface of the virtual region presents information about a cloud service of the second region.

Optionally, the virtual region does not occupy a hardware resource and a software resource of the hosted cloud.

In a possible implementation of the third aspect, the control interface of the first region and the control interface of the virtual region include a same page static file.

According to a fourth aspect, this application provides a charging method for a cloud system, where the method is performed by a computing device system. In the method, the cloud system includes a hosted cloud, an allied cloud, and an alliance management apparatus, the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped by the second region in the hosted cloud. The method includes obtaining, by the alliance management apparatus, a service detail record generated by the allied cloud for the user using a cloud service of the second region, where the service detail record includes a usage parameter recorded when the user uses the cloud service of the second region, and the usage parameter may be duration, traffic, a capacity, and the like generated when the user uses the cloud service, and providing, by the alliance management apparatus, the service detail record for the hosted cloud. According to the method, statistics on fees generated for the user using the cloud service of the second region of the allied cloud is collected by the hosted cloud, and the hosted cloud performs unified settlement with the user on a cloud service bill generated for the user in the hosted cloud and a cloud service bill generated for the user in the allied cloud, thereby improving efficiency of the user performing settlement on cloud service bills in the cloud system.

Optionally, the virtual region does not occupy a hardware resource and a software resource of the hosted cloud.

In a possible implementation of the fourth aspect, the user registers a shadow account with the allied cloud, and the obtaining a service detail record generated by the allied cloud for the user using a cloud service of the second region of the allied cloud includes determining the shadow account in the allied cloud based on an identifier of the hosted cloud, and obtaining the service detail record corresponding to the determined shadow account.

In a possible implementation of the fourth aspect, the method further includes receiving, by the alliance management apparatus, a service stop request sent by the hosted cloud, where the service stop request is used to freeze permission of a defaulting user to use the cloud service of the second region, and the service stop request includes an identifier of the defaulting user and the identifier of the hosted cloud, and sending the service stop request to the allied cloud.

According to a fifth aspect, this application provides an alliance management apparatus, where a cloud system in which the alliance management apparatus is located further includes a hosted cloud and an allied cloud, the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped by the second region in the hosted cloud. The alliance management apparatus includes an API agent communications unit and an API agent processing unit, where the API agent communications unit is configured to receive an API request sent by a client of the user, the API request is used to request to process a cloud service in the virtual region of the hosted cloud, the API agent processing unit is configured to replace an API endpoint domain name of the virtual region that is carried in the API request with an API endpoint domain name of the second region, and the API agent communications unit is further configured to forward an API request obtained after the replacement to an API endpoint of the second region, where the API request obtained after the replacement is used to request to process the cloud service in the second region.

Optionally, the virtual region does not occupy a hardware resource and a software resource of the hosted cloud.

In a possible implementation of the fifth aspect, the API endpoint domain name of the virtual region corresponds to an IP address of the alliance management apparatus in a DNS.

In a possible implementation of the fifth aspect, the API agent processing unit is configured to query configuration information based on the API endpoint domain name of the virtual region, to obtain the API endpoint domain name of the second region, where the configuration information records a correspondence between an API endpoint domain name of the virtual region and an API endpoint domain name of the second region, and replace the API endpoint domain name of the virtual region that is carried in the API request based on the obtained API endpoint domain name of the second region.

In a possible implementation of the fifth aspect, the API agent processing unit is configured to convert the API endpoint domain name of the virtual region into the API endpoint domain name of the second region based on a pre-configured domain name rule.

In a possible implementation of the fifth aspect, the domain name rule includes a correspondence between a region identifier included in the API endpoint domain name of the virtual region and a region identifier included in the API endpoint domain name of the second region.

In a possible implementation of the fifth aspect, the domain name rule includes a correspondence between a cloud identifier included in the API endpoint domain name of the virtual region and a cloud identifier included in the API endpoint domain name of the second region.

In a possible implementation of the fifth aspect, the API agent communications unit is further configured to receive an API response sent by the API endpoint of the second region based on the API request, where the API response includes information about the processed cloud service, the API agent processing unit is further configured to replace the API endpoint domain name of the second region that is in the API response with the API endpoint domain name of the virtual region, to obtain an API response obtained after the replacement, and the API agent communications unit is further configured to return the API response obtained after the replacement to the client.

In a possible implementation of the fifth aspect, the alliance management apparatus further includes a federation agent communications unit and a federation agent processing unit, the federation agent communications unit is configured to receive an account name and a password of the user that are sent by the client, the federation agent processing unit is configured to obtain a first authentication token of the user from the hosted cloud based on the account name and the password of the user, determine, based on the first authentication token of the user, that the user has permission to process a cloud service of the second region, and obtain a second authentication token of the user from the allied cloud, the federation agent communications unit is further configured to send the second authentication token of the user to the API agent communications unit, and the API communications unit is further configured to send the second authentication token to the client, where the API request carries the second authentication token.

In a possible implementation of the fifth aspect, the API request further carries key information of the user, and the alliance management apparatus further includes a federation agent processing unit, and the federation agent processing unit is configured to obtain a first authentication token of the user from the hosted cloud based on the key information of the user, determine, based on the first authentication token of the user, that the user has permission to process a cloud service of the second region, obtain a second authentication token of the user from the allied cloud, and add the second authentication token of the user to the API request obtained after the replacement.

According to a sixth aspect, this application provides an alliance management apparatus, where a cloud system in which the alliance management apparatus is located further includes a hosted cloud and an allied cloud, the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped by the second region in the hosted cloud. The alliance management apparatus includes a control interface agent communications unit and a control interface agent processing unit, the control interface agent communications unit is configured to receive a control interface request sent by a client of the user, where the control interface request is used to request a control interface of the virtual region, the control interface agent processing unit is configured to generate a page static file request and a cloud service information request based on the control interface request, obtain, based on the page static file request, a page static file response provided by the hosted cloud, obtain, based on the cloud service information request, a cloud service information response provided by the allied cloud, and generate a control interface response based on the page static file response and the cloud service information response, and the control interface agent communications unit is further configured to send the control interface response to the client.

Optionally, the virtual region does not occupy a hardware resource and a software resource of the hosted cloud.

In a possible implementation of the sixth aspect, the control interface request sent by the client includes a control interface domain name of the virtual region, and the control interface agent processing unit is further configured to obtain a control interface domain name of the second region based on the control interface domain name of the virtual region, and generate the cloud service information request based on the control interface domain name of the second region.

In a possible implementation of the sixth aspect, the control interface domain name of the virtual region corresponds to an IP address of the alliance management apparatus in a DNS.

In a possible implementation of the sixth aspect, the control interface agent processing unit is further configured to query configuration information based on the control interface domain name of the virtual region, to obtain the control interface domain name of the second region, where the configuration information records a correspondence between a control interface domain name of the virtual region and a control interface domain name of the second region.

In a possible implementation of the sixth aspect, the control interface agent processing unit is further configured to convert the control interface domain name of the virtual region into the control interface domain name of the second region based on a pre-configured domain name rule.

In a possible implementation of the sixth aspect, the domain name rule includes a correspondence between a region identifier included in the control interface domain name of the virtual region and a region identifier included in the control interface domain name of the second region.

In a possible implementation of the sixth aspect, the domain name rule includes a correspondence between a cloud identifier included in the control interface domain name of the virtual region and a cloud identifier included in the control interface domain name of the second region.

In a possible implementation of the sixth aspect, the control interface agent communications unit is further configured to receive the cloud service information response sent by the allied cloud, where the cloud service information response includes the control interface domain name of the second region and the cloud service information, and the control interface agent processing unit is further configured to replace the control interface domain name of the second region that is included in the cloud service information response with the control interface domain name of the virtual region, and generate the control interface response based on the page static file response and a cloud service information response obtained after the replacement.

According to a seventh aspect, this application provides a cloud management apparatus, where the cloud management apparatus includes a hosted cloud control interface processing unit, a hosted cloud control interface communications unit, a control interface agent communications unit, and a control interface agent processing unit, the hosted cloud control interface processing unit and the hosted cloud control interface communications unit are located in a hosted cloud of a cloud system, the control interface agent communications unit and the control interface agent processing unit are located in an alliance management apparatus of the cloud system, the cloud system further includes an allied cloud, the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped by the second region in the hosted cloud. The hosted cloud control interface processing unit is configured to provide a management interface of the hosted cloud, where the management interface of the hosted cloud includes a region selection subinterface, and the region selection subinterface includes an element of the first region and an element of the virtual region, the hosted cloud control interface communications unit is configured to receive a first control interface request sent by a client of the user, where the first control interface request is generated when the user selects the element of the first region, the hosted cloud control interface processing unit is further configured to provide a control interface of the first region for the client based on the first control interface request, where the control interface of the first region presents information about a cloud service of the first region, the control interface agent communications unit is configured to receive a second control interface request sent by the client, where the control interface request is generated when the user selects the element of the virtual region, and the control interface agent processing unit is configured to provide a control interface of the virtual region for the client based on the second control interface request, where the control interface of the virtual region presents information about a cloud service of the second region.

Optionally, the virtual region does not occupy a hardware resource and a software resource of the hosted cloud.

In a possible implementation of the seventh aspect, the control interface of the first region and the control interface of the virtual region include a same page static file.

According to an eighth aspect, this application provides an alliance management apparatus, where a cloud system in which the alliance management apparatus is located further includes a hosted cloud and an allied cloud, the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped by the second region in the hosted cloud. The alliance management apparatus includes a service detail record agent processing unit, configured to obtain a service detail record generated by the allied cloud for the user using a cloud service of the second region, where the service detail record includes a usage parameter recorded when the user uses the cloud service of the second region, and a service detail record agent communications unit, configured to provide the service detail record for the hosted cloud.

Optionally, the virtual region does not occupy a hardware resource and a software resource of the hosted cloud.

In a possible implementation of the eighth aspect, the user registers a shadow account with the allied cloud, and the obtaining a service detail record generated by the allied cloud for the user using a cloud service of the second region includes determining the shadow account in the allied cloud based on an identifier of the hosted cloud, and obtaining the service detail record corresponding to the determined shadow account.

In a possible implementation of the eighth aspect, the service detail record agent communications unit is further configured to receive a service stop request sent by the hosted cloud, where the service stop request is used to freeze permission of a defaulting user to use the cloud service of the second region, and send the service stop request to the allied cloud.

According to a ninth aspect, this application provides a computing device system. The computing device system includes at least one computing device, and each computing device includes a memory and a processor. The processor of the at least one computing device is configured to access code in the memory, to perform the method according to any one of the first aspect or the possible implementations of the first aspect.

According to a tenth aspect, this application provides a computing device system. The computing device system includes at least one computing device, and each computing device includes a memory and a processor. The processor of the at least one computing device is configured to access code in the memory, to perform the method according to any one of the second aspect or the possible implementations of the second aspect.

According to an eleventh aspect, this application provides a computing device system. The computing device system includes at least one computing device, and each computing device includes a memory and a processor. The processor of the at least one computing device is configured to access code in the memory, to perform the method according to any one of the third aspect or the possible implementations of the third aspect.

According to a twelfth aspect, this application provides a computing device system. The computing device system includes at least one computing device, and each computing device includes a memory and a processor. The processor of the at least one computing device is configured to access code in the memory, to perform the method according to any one of the fourth aspect or the possible implementations of the fourth aspect.

According to a thirteenth aspect, this application provides a non-transitory readable storage medium, where when the non-transitory readable storage medium is executed by a computing device, the computing device performs the method according to any one of the first aspect or the possible implementations of the first aspect. The storage medium stores a program, and the storage medium includes but is not limited to a volatile memory, for example, a random access memory, and a nonvolatile memory, for example, a flash memory, a hard disk, or a solid-state drive.

According to a fourteenth aspect, this application provides a non-transitory readable storage medium, where when the non-transitory readable storage medium is executed by a computing device, the computing device performs the method according to any one of the second aspect or the possible implementations of the second aspect. The storage medium stores a program, and the storage medium includes but is not limited to a volatile memory, for example, a random access memory, and a nonvolatile memory, for example, a flash memory, a hard disk, or a solid-state drive.

According to a fifteenth aspect, this application provides a non-transitory readable storage medium, where when the non-transitory readable storage medium is executed by a computing device, the computing device performs the method according to any one of the third aspect or the possible implementations of the third aspect. The storage medium stores a program, and the storage medium includes but is not limited to a volatile memory, for example, a random access memory, and a nonvolatile memory, for example, a flash memory, a hard disk, or a solid-state drive.

According to a sixteenth aspect, this application provides a non-transitory readable storage medium, where when the non-transitory readable storage medium is executed by a computing device, the computing device performs the method according to any one of the fourth aspect or the possible implementations of the fourth aspect. The storage medium stores a program, and the storage medium includes but is not limited to a volatile memory, for example, a random access memory, and a nonvolatile memory, for example, a flash memory, a hard disk, or a solid-state drive.

According to a seventeenth aspect, this application provides a computing device program product, where the computing device program product includes a computer instruction, and when the computer instruction is executed by a computing device, the computing device performs the method according to any one of the first aspect or the possible implementations of the first aspect. The computer program product may be a software installation package provided by a cloud service provider of a hosted cloud or a cloud service provider of an allied cloud. When the method according to any one of the first aspect or the possible implementations of the first aspect needs to be used, the computer program product may be downloaded and executed on a computing device.

According to an eighteenth aspect, this application provides a computing device program product, where the computing device program product includes a computer instruction, and when the computer instruction is executed by a computing device, the computing device performs the method according to any one of the second aspect or the possible implementations of the second aspect. The computer program product may be a software installation package provided by a cloud service provider of a hosted cloud or a cloud service provider of an allied cloud. When the method according to any one of the second aspect or the possible implementations of the second aspect needs to be used, the computer program product may be downloaded and executed on a computing device.

According to a nineteenth aspect, this application provides a computing device program product, where the computing device program product includes a computer instruction, and when the computer instruction is executed by a computing device, the computing device performs the method according to any one of the third aspect or the possible implementations of the third aspect. The computer program product may be a software installation package provided by a cloud service provider of a hosted cloud or a cloud service provider of an allied cloud. When the method according to any one of the third aspect or the possible implementations of the third aspect needs to be used, the computer program product may be downloaded and executed on a computing device.

According to a twentieth aspect, this application provides a computing device program product, where the computing device program product includes a computer instruction, and when the computer instruction is executed by a computing device, the computing device performs the method according to any one of the fourth aspect or the possible implementations of the fourth aspect. The computer program product may be a software installation package provided by a cloud service provider of a hosted cloud or a cloud service provider of an allied cloud. When the method according to any one of the fourth aspect or the possible implementations of the fourth aspect needs to be used, the computer program product may be downloaded and executed on a computing device.

According to a twenty-first aspect, this application provides an ally management method of a cloud federation. The cloud federation includes a hosted cloud and an allied cloud, the hosted cloud and the allied cloud respectively provide a first cloud service for a first user that registers an account with the hosted cloud and a second cloud service for a second user that registers an account with the allied cloud, the hosted cloud provides the first cloud service based on a hardware resource and a software resource of the hosted cloud, and the allied cloud provides the second cloud service based on a hardware resource and a software resource of the allied cloud. The method includes receiving a request sent by a client of the first user or the hosted cloud, where the request is used to request to process the second cloud service for the first user, sending the request to the allied cloud, receiving a response of the allied cloud, and sending the response of the allied cloud to the hosted cloud or the client of the first user.

In a possible implementation of the twenty-first aspect, processing on the second cloud service by the first user includes any one of the following creating, deleting, configuration modification, querying, capacity expansion, authentication, and usage freezing. A request for usage freezing may be sent by the hosted cloud, and the request used to request to process the second cloud service may be sent by the client of the first user.

In a possible implementation of the twenty-first aspect, the request is an API request, and the response of the allied cloud is an API response.

In a possible implementation of the twenty-first aspect, the request is a control interface request, and the response of the allied cloud is cloud service information response.

According to a twenty-second aspect, this application provides a computing device system. The computing device system includes at least one computing device, and each computing device includes a memory and a processor. The processor of the at least one computing device is configured to access code in the memory, to perform the method according to any one of the twenty-first aspect or the possible implementations of the twenty-first aspect.

According to a twenty-third aspect, this application provides a non-transitory readable storage medium, where when the non-transitory readable storage medium is executed by a computing device, the computing device performs the method according to any one of the twenty-first aspect or the possible implementations of the twenty-first aspect. The storage medium stores a program, and the storage medium includes but is not limited to a volatile memory, for example, a random access memory, and a nonvolatile memory, for example, a flash memory, a hard disk, or a solid-state drive.

According to a twenty-fourth aspect, this application provides a computing device program product, where the computing device program product includes a computer instruction, and when the computer instruction is executed by a computing device, the computing device performs the method according to any one of the twenty-first aspect or the possible implementations of the twenty-sixth aspect. The computer program product may be a software installation package provided by a cloud service provider of a hosted cloud or a cloud service provider of an allied cloud. When the method according to any one of the twenty-first aspect or the possible implementations of the twenty-first aspect needs to be used, the computer program product may be downloaded and executed on a computing device.

BRIEF DESCRIPTION OF DRAWINGS

To describe technical methods in embodiments of this application more clearly, the following briefly describes the accompanying drawings required for describing the embodiments.

DESCRIPTION OF EMBODIMENTS

Figure 1:
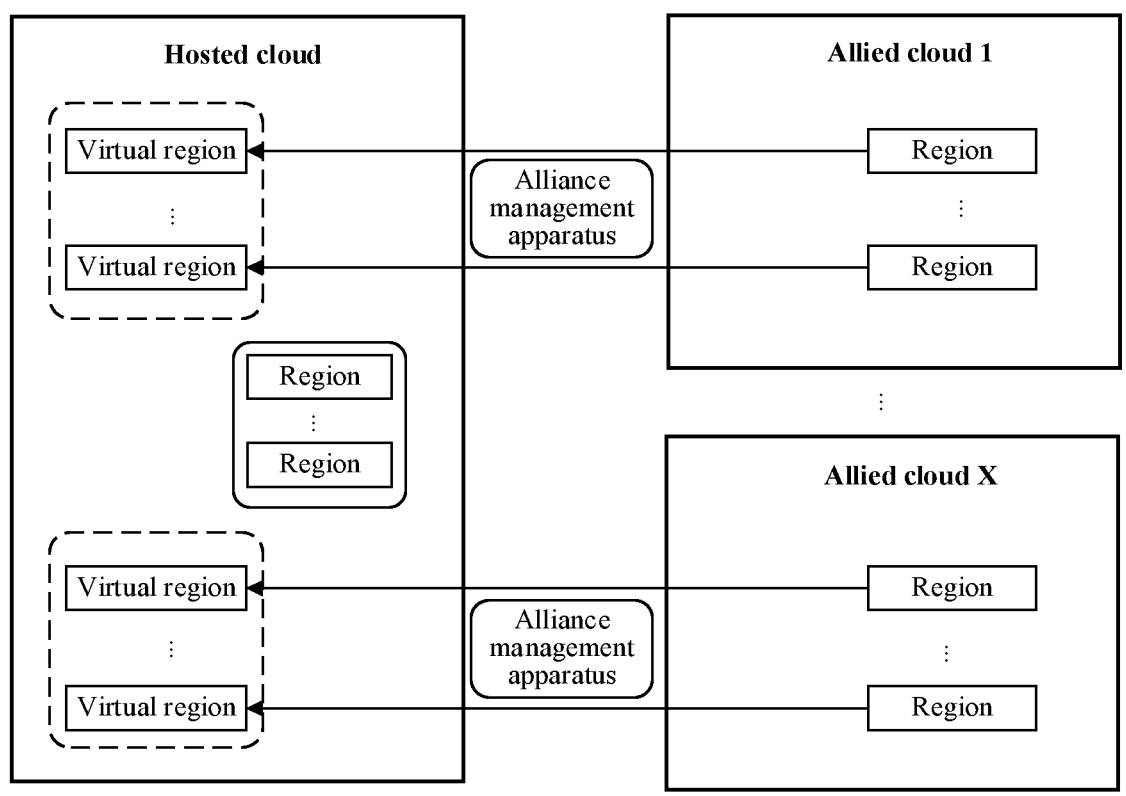
FIG. 1 is a schematic diagram of mapping of a region of an allied cloud to a virtual region of a hosted cloud according to an embodiment of this application.

The following describes solutions in embodiments of this application with reference to the accompanying drawings in this application.

Brief Introduction of Terms

Cloud computing is a mode in which an internet technology is used to aggregate large and scalable IT capabilities (namely, resources such as computing, storage, and network resources) to be provided for a user as a cloud service.

A cloud is a set of a series of hardware resources and software resources. Generally, a plurality of regions are set in one cloud in various countries/regions, each region includes at least one data center, and a hardware resource and a software resource are set in each data center. Different cloud service providers establish different clouds, for example, HUAWEI CLOUD of HUAWEI, AZURE Cloud of MICROSOFT, and the like. Different clouds provide renting of resources (including computing, storage, network, application, and the like) for a user in a form of a cloud service. A size of a cloud is dynamically scalable, to meet a need of application and user scale growth by aggregating more resources. Cloud computing supports the user in obtaining a cloud service at various locations by using a plurality of terminals, and a hardware resource and a software resource that support the cloud service come from a cloud. Common cloud services fall into three types an infrastructure as a service (IaaS), a platform as a service (PaaS), and a software as a service (SaaS). The infrastructure as a service includes a virtual machine-computing service, a data storage service, and the like, and mainly provides resources such as a hardware device, in a form of a virtual machine/container, for the user as a service, and the user may install and run an application of the user by using a virtual machine or a storage resource provided in the cloud service. The platform as a service mainly enables a developer to construct and deploy application programs of the developer on an infrastructure and an operating environment that are provided by a cloud, and allows these application programs to use resources in the cloud infrastructure. The software as a service provides some application programs running in a cloud for a user as a service according to a requirement, for example, a cloud-based speech-to-text service, a cloud-based face recognition service, and the like.

A cloud federation is a cloud system that includes a hosted cloud, at least one allied cloud, and at least one alliance management apparatus. The hosted cloud and the allied cloud in the cloud federation sign an alliance agreement. The hosted cloud interacts with a user, and provides a unified cloud service, unified bill payment, a unified control interface, and the like for the user. The cloud service provided by the hosted cloud for the user comes from one or more regions of the hosted cloud or the allied cloud.

A hosted cloud is a cloud that interacts with a user in a cloud federation, and directly provides a cloud service, bill payment, and a control interface of one or more regions for the user. The hosted cloud may be a public cloud, a private cloud, a hybrid cloud, or the like.

An allied cloud is a cloud that does not directly interact with a user in a cloud federation, and indirectly provides a cloud service of one or more regions for the user by using a hosted cloud. Cloud service fees generated for a user in the allied cloud are subject to unified settlement between the hosted cloud and the user according to a transaction price, and fees that should be charged for a cloud service provided by the allied cloud are subject to settlement between the hosted cloud and the allied cloud according to an alliance relationship price. The allied cloud may be a public cloud, a private cloud, a hybrid cloud, or the like.

As the cloud computing mode emerges and develops, an increasing quantity of enterprises, organizations, or individuals use a cloud service to perform various types of work and entertainment. When planning to expand service countries and service regions, a cloud service provider is usually subject to an economic constraint that large capital costs (for example, costs for construction and maintenance of basic hardware facilities) need to be invested and constraints of national laws, regulations, and policies (for example, data security and data export control). These constraints not only have huge impact on service expansion of the cloud service provider, but also cause troubles to a user when the user needs to access cloud services of a plurality of clouds (for example, a user needs to register an account with a plurality of clouds, and perform bill settlement with the plurality of clouds).

In view of this, the present disclosure provides a method for providing a cloud service for a user in a cloud federation, to resolve the foregoing problems. A plurality of clouds sign an alliance agreement to build a cloud federation. The clouds in the cloud federation may belong to different cloud service providers, or may belong to different regions of countries of a same cloud service provider (for example, a China region and a region outside China). In the cloud federation, the hosted cloud interacts with a user, and provides, for the user, cloud services of one or more regions of the hosted cloud or the allied cloud in the cloud federation.

When signing the alliance agreement, the plurality of clouds may constitute different alliance relationships based on different signed content. When the signed content in the alliance agreement is a mutual alliance relationship, in the cloud federation, identities of the hosted cloud and the allied cloud may be interchangeable based on different users. For example, there are two clouds a cloud A and a cloud B. The cloud A and the cloud B sign an alliance agreement to build a cloud federation. It is specified in the alliance agreement that the cloud A and the cloud B are in a mutual alliance relationship. In the cloud federation, for a user that registers an account with the cloud A (that is, a user that directly interacts with the cloud A, to obtain a cloud service of the entire cloud federation), the cloud A is the hosted cloud, and the cloud B is the allied cloud. For a user that registers an account with the cloud B (that is, a user that directly interacts with the cloud B, to obtain a cloud service of the entire cloud federation), the cloud B is the hosted cloud, and the cloud A is the allied cloud.

When the signed content in the alliance agreement is a one-way alliance relationship, in the cloud federation, concepts of the hosted cloud and the allied cloud are valid for only one cloud, and the hosted cloud and the allied cloud have fixed identities. For example, there are two clouds a cloud A and a cloud B. The cloud A and the cloud B sign an alliance agreement to build a cloud federation. In the alliance agreement, a user of the cloud A not only can use a cloud service of the cloud A, but also can use a cloud service of the cloud B. However, a user of the cloud B has no permission to use a cloud service of the cloud A. In the cloud federation, for the user of the cloud A, the cloud A is the hosted cloud, and the cloud B is the allied cloud, and for the user of the cloud B, concepts of the hosted cloud and the allied cloud do not exist, and the user of the cloud B can use only the cloud service of the cloud B.

In the embodiments of this application, unless otherwise stated, a "user" refers to a user of a hosted cloud in a cloud federation, that is, a user that completes registration in the hosted cloud, and the user has an account in the hosted cloud.

A transaction price is an actual sales price of a cloud service traded when the hosted cloud in the cloud federation trades in the cloud service with a user.

An alliance price is a price paid by the hosted cloud in the cloud federation for a cloud service indirectly provided by the allied cloud for a user.

A region, an availability zone, and a data center are as follows. Generally, different regions are geographically spaced at a greater distance (for example, a northern region of China, a southern region of China, and a western region of the United States that are provided by a cloud service provider). Each region includes a plurality of mutually isolated zones, which are referred to as availability zones. Availability zones in a same region are independent of each other in electric power supply and networks, so as to improve reliability of the region, and availability zones of a same region are connected by using a low-latency network. Each availability zone in a region includes at least one data center, and each data center includes a certain amount of hardware resources and software resources.

A cloud service provider has a large amount of resources (including a computing resource, a storage resource, a network resource, and the like), and the resources are distributed in a plurality of data centers in a plurality of availability zones of at least one region. The cloud service provider builds a cloud service platform based on these resources, and provides a service for a user by using the cloud service platform. The cloud service platform provides various cloud services, for example, computing services such as a virtual machine and a container that are established based on a computing resource (for example, a server), storage services such as block storage and object-based storage that are established based on a storage resource (for example, a hard disk or solid-state drive or storage array in a server), and network services such as a content delivery network and network bandwidth that are established based on network resources (for example, various gateway devices and switching devices). In the cloud federation, resources, on which a cloud service requested by a user in the hosted cloud is based, may come from a data center of one or more availability zones of a region of the hosted cloud, or may come from a data center of one or more availability zones of a region of the allied cloud.

A virtual region is a region formed by mapping of a region of the allied cloud to the hosted cloud in the cloud federation. A quantity of virtual regions is equal to a quantity of regions of the allied cloud, and the virtual region is in a one-to-one correspondence with the region of the allied cloud. That a user accesses a virtual region in the hosted cloud is actually accessing a region, corresponding to the virtual region, of the allied cloud.

Optionally, the virtual region does not occupy a hardware resource and a software resource of the hosted cloud.

FIG. 1 is a schematic diagram of mapping of a region of an allied cloud to a virtual region of a hosted cloud. At least one allied cloud and a hosted cloud jointly constitute a cloud federation. At least one region in each allied cloud is mapped to the hosted cloud, to form a virtual region of the hosted cloud. A user may indirectly access the region of the allied cloud by accessing the virtual region of the hosted cloud by using an alliance management apparatus, and the user is imperceptible to a difference between a style and an access manner of accessing a cloud service of the virtual region of the hosted cloud and a style and an access manner of accessing a cloud service of a region of the hosted cloud. There may be one or more alliance management apparatuses. Each alliance management apparatus may be completely or partially deployed in any one or more of the hosted cloud, the allied cloud, and a third-party data center. The virtual region of the hosted cloud and a region of the hosted cloud each have an independent domain name, and have a same domain name style. After the region of the allied cloud is mapped to the virtual region of the hosted cloud, the domain name style of the virtual region is the domain name style of the region of the hosted cloud. The region and the virtual region of the hosted cloud each have a plurality of domain names, which include but are not limited to control interface domain names of the region and the virtual region of the hosted cloud, API endpoint domain names of the region and the virtual region of the hosted cloud, and the like.

In the cloud federation, each domain name of the region and the virtual region of the hosted cloud includes a first part and a second part. The first part includes an identifier of a cloud in which a region that is indicated by the domain name is located, and the second part includes an identifier of the region that is indicated by the domain name. The domain name of the virtual region of the hosted cloud is mapped by a domain name of the region of the allied cloud in the hosted cloud. Each domain name of the virtual region of the hosted cloud is in a one-to-one correspondence with each domain name of the region of the allied cloud. Each domain name of the virtual region of the hosted cloud and a corresponding domain name of the region of the allied cloud have different first parts. The first part of the domain name of the virtual region of the hosted cloud includes an identifier of the hosted cloud, and the first part of the domain name of the region of the allied cloud includes an identifier of the allied cloud. Each domain name of the virtual region of the hosted cloud and a corresponding domain name of the region of the allied cloud have a same or a corresponding second part, and the second parts each are used to indicate information about a region that is indicated by the domain name.

A mother account and an account are as follows. The mother account is a master account created by the user in the hosted cloud. The user logs in to the mother account to perform authentication, cloud service consumption, and the like in the hosted cloud. Generally, the mother account is established and maintained by management personnel of an enterprise or an organization of the user. The management personnel may create a plurality of accounts under the mother account to be provided for other users of the enterprise or the organization for use. Different users may also log in to the accounts under the mother account to perform authentication, cloud service consumption, and the like in the hosted cloud, and all cloud service consumption records of the accounts are managed by the mother account.

A shadow account is an account that is registered with the allied cloud by a user, and is in a one-to-one correspondence with the mother account of the user in the hosted cloud. The user of the hosted cloud may consume a cloud service in the hosted cloud by using the mother account or the account in the hosted cloud, and the hosted cloud uses a shadow account, corresponding to the mother account of the user, in the allied cloud to enable the user to consume a cloud service of the allied cloud.

An agent account is an account registered with the allied cloud by the hosted cloud when the cloud federation is built. The agent account includes an identifier of an agent contract signed between the allied cloud and the hosted cloud. The identifier of the agent contract indicates a permission identifier required by the hosted cloud for registering the shadow account with the allied cloud and for processing a cloud service. The agent account has a function of managing all shadow accounts in the allied cloud.

Figure 2:
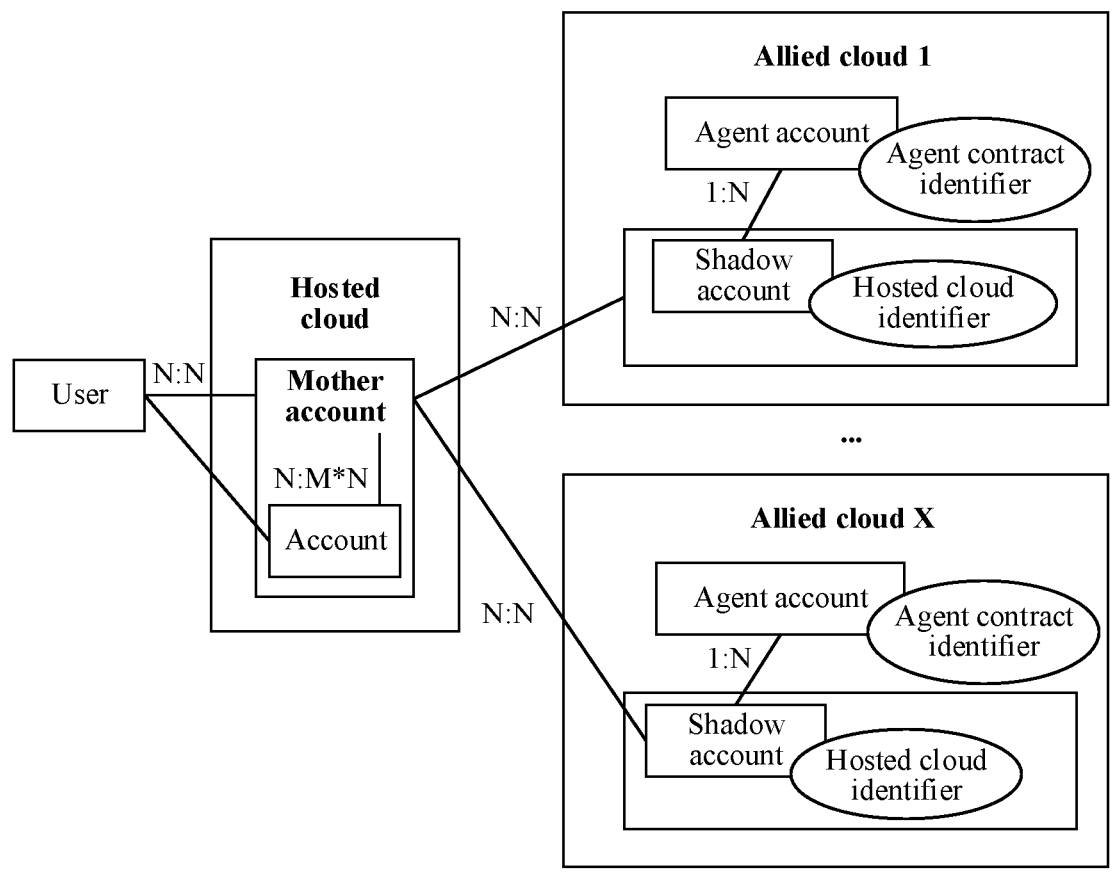
FIG. 2 is a schematic diagram of a relationship between a mother account, an account, a shadow account, and an agent account according to an embodiment of this application.

FIG. 2 shows a relationship between a mother account registered with a hosted cloud by a user, an account registered by the user under the mother account, a shadow account registered by the hosted cloud with an allied cloud for the user, and an agent account registered by the hosted cloud with the allied cloud. A mother account in the hosted cloud is in a one-to-one correspondence with a shadow account in the allied cloud. In other words, a quantity of mother accounts registered by users with the hosted cloud is equal to a quantity of corresponding shadow accounts created by the hosted cloud in the allied cloud for the user, and each shadow account includes a hosted cloud identifier and a mother account identifier that are used to indicate an attribute of the shadow account. FIG. 2 is used an example, the hosted cloud registers an agent account with each of an allied cloud 1 and an allied cloud X, N users register N mother accounts with the hosted cloud, and the hosted cloud registers a shadow account with each of the allied cloud 1 and the allied cloud X for each user, so that the hosted cloud registers N shadow accounts with each of the allied cloud 1 and the allied cloud X. Each user registers M accounts under the mother account of the user, and M accounts belonging to a same mother account correspond to one shadow account in the allied cloud.

It should be noted that, one hosted cloud may sign an agent contract with a plurality of allied clouds, and therefore one mother account of the hosted cloud may correspond to shadow accounts in a plurality of different allied clouds.

A shadow account, corresponding to a mother account of each user in the hosted cloud, in the allied cloud is associated with an agent account created by the hosted cloud in the allied cloud, and the agent account has management rights to all shadow accounts. Therefore, a relationship between a quantity of agent accounts and a quantity of shadow accounts is 1:N. In other words, there is only one agent account in each allied cloud, and the agent account may be responsible for managing N shadow accounts in the allied cloud. When using a cloud service of the allied cloud, each user in the hosted cloud takes an identity of a shadow account, corresponding to a mother account of the user, in the allied cloud to process the cloud service of the allied cloud.

Figure 3:
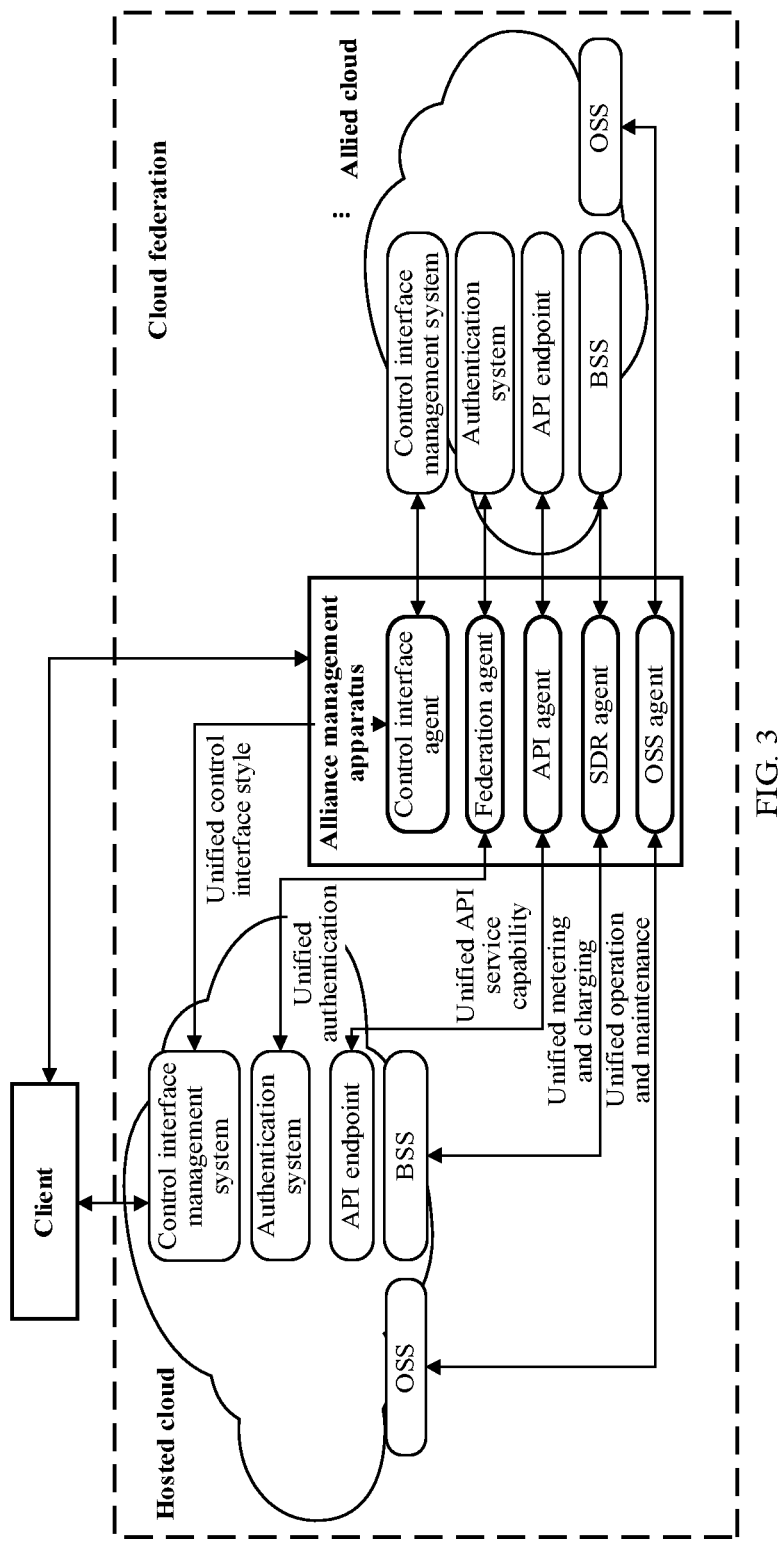
FIG. 3 is a schematic structural diagram of a cloud federation according to an embodiment of this application.

FIG. 3 is a schematic structural diagram of a cloud federation according to an embodiment of this application.

As shown in FIG. 3, the cloud federation includes a hosted cloud and an allied cloud, and there may be a plurality of allied clouds. When the cloud federation is used to provide a cloud service, the hosted cloud and the allied cloud interconnect to each other by using an alliance management apparatus. In the cloud federation, the hosted cloud interacts with a user, to provide a unified cloud service for the user. The unified cloud service includes cloud services of one or more regions in the hosted cloud and cloud services of one or more regions in the allied cloud. The user is imperceptible to a difference between using the cloud service from the hosted cloud and using the cloud service from the allied cloud.

The hosted cloud and the allied cloud in the cloud federation may be clouds established by different cloud service providers, or may be regions established by a same cloud service provider in different countries. Each of the hosted cloud and the allied cloud includes a control interface management system, an authentication system, an API endpoint, a business support system (BSS), an operation support system (OSS), and the like. The following describes the modules in detail.

The control interface management system is a system that provides a control interface for interacting with a user. The user selects, on the control interface, a method for processing a cloud service that the user wants to request, and creates a control interface request. The control interface management system receives the control interface request, and further accesses a corresponding cloud service control interface response. The control interface management system is further responsible for presenting the control interface response to the user by using the control interface.

The authentication system is a system configured to unify user management and identity authentication. The authentication system is configured to perform account authentication for a user, and provide an authentication token for the user, where the authentication token is a permission identifier for the user to use a cloud service.

The API endpoint indicates a location of a resourced required for performing a function in an API request, and each region of each cloud has at least one API endpoint.

The BSS includes a service detail record collection system, a charging and settlement system, and an accounting system, where the charging and settlement system in the BSS is configured to perform charging, settlement, and the like for a collected service detail record based on a charging model.

The OSS is a comprehensive service operation and management platform, and provides a plurality of channels such as a worksheet, a call, a mailbox, a dedicated service manager, and the like for a user for submitting failures.

The cloud federation provides a unified cloud service for the user, so that although cloud services obtained by the user in the cloud federation may come from different cloud service providers, or may come from different regions of a country of a same cloud service provider (that is, come from a hosted cloud or any one or more allied clouds), experience of the user during usage of these cloud services is like that these cloud services are provided by a same cloud service provider. To enable the user to achieve unified experience during usage of different cloud services in the cloud federation, unification needs to be performed in the following aspects.

A unified account. In the cloud federation, the user only needs to register a mother account with the hosted cloud, to use cloud services in the cloud federation (including a cloud service provided by the hosted cloud and a cloud service provided by the allied cloud) by using the mother account or an account under the mother account. To achieve the foregoing function, it is required that the authentication system of the hosted cloud (for example, an identity and access management (IAM) module) is responsible for creating and authenticating an account in the hosted cloud for the user, the hosted cloud creates a shadow account, corresponding to the mother account in the hosted cloud, in the allied cloud for the user, the shadow account is used in the allied cloud to obtain the cloud service of the allied cloud, and the user is imperceptible to the shadow account. Therefore, the user can use cloud services of a plurality of clouds by using only one account.

Unified control interface experience. A cloud service control interface provided by the cloud federation for the user is uniformly displayed as a page static style of the hosted cloud, so that the user is visually imperceptible during usage of a cloud service across clouds.

Service capability of a unified API. It is ensured that all cloud services in the cloud federation can be used by the user, that is, it is ensured that API endpoints of cloud services of various regions (including a region of the hosted cloud and a region of the allied cloud) in the cloud federation can be accessed.

Unified metering and charging. Cloud service service detail records of the user in various regions of the hosted cloud and the allied cloud are centrally charged by the hosted cloud, and are then subject to unified settlement between the user and the hosted cloud.

Unified operation and maintenance capability. Operation and maintenance information of each allied cloud is centrally processed by the hosted cloud (for example, a worksheet and an email of the user in the allied cloud are centrally processed by the hosted cloud).

In the cloud federation, the unification in the foregoing plurality of aspects is implemented by the alliance management apparatus. The alliance management apparatus includes at least one of the following modules a control interface agent, a federation agent, an API agent, a service detail record agent, and an OSS agent. One or more alliance management apparatuses may be set in the cloud federation. When there are a plurality of alliance management apparatuses, each alliance management apparatus is configured to maintain an alliance relationship between the hosted cloud and some allied clouds, each alliance management apparatus may be completely or partially deployed in any one or more of the hosted cloud, the allied cloud, and a third-party data center. For example, the control interface agent, the API agent, and the federation agent in the alliance management apparatus are deployed in the hosted cloud, the service detail record agent and the OSS agent are deployed in the allied cloud.

The alliance management apparatus is configured to receive a request sent by the hosted cloud or a client of a user that registers an account with the hosted cloud. The request is used to request to process, for the user, a cloud service provided by the allied cloud. The alliance management apparatus is further configured to send the request to the allied cloud, receive a response from the allied cloud, and send the response of the allied cloud to the hosted cloud or the client of the user.

The alliance management apparatus may be configured for the user to process, by invoking an API of the allied cloud, the cloud service provided by the allied cloud. When the user processes, by invoking the API of the allied cloud, the cloud service provided by the allied cloud, the request is an API request, and the API request may be used to request to perform the following operations on the cloud service in the allied cloud creating, deleting, configuration modification, querying, capacity expansion, authentication, and usage freezing. The API request used to freeze usage of the cloud service may be sent by the hosted cloud. A response of the allied cloud is an API response.

The alliance management apparatus may alternatively be configured for the user to use a control interface to process the cloud service provided by the allied cloud. When the user uses the control interface to process the cloud service provided by the allied cloud, the request is a control interface request, and the control interface request may be used to request to perform the following operations on the cloud service in the allied cloud creating, deleting, configuration modification, querying, capacity expansion, authentication, and usage freezing. The control interface request used to freeze usage of the cloud service may be sent by the hosted cloud. A response of the allied cloud is a cloud service information response.

When the alliance management apparatus is configured to perform authentication in the allied cloud for a user that registers an account with the hosted cloud, the request may also be referred to as an authentication request. The authentication request may be an API request, or may be a control interface request, and a response of the allied cloud may also be referred to as an authentication response.

When the alliance management apparatus is configured to freeze permission of a defaulting user in the hosted cloud to use the cloud service in the allied cloud, the request may also be referred to as a service stop request. The service stop request may be an API request, or may be a control interface request, and a response of the allied cloud may also be referred to as a service stop response.

The modules in the alliance management apparatus have different functions. The modules in the alliance management apparatus may independently perform an operation in a scenario in which the cloud federation provides a unified cloud service and a unified operation and maintenance capability for a user. Alternatively, a plurality of modules may perform, in a cooperative manner, an operation in a scenario in which the cloud federation provides a unified cloud service and a unified operation and maintenance capability for a user.

Specific functions of the modules in the alliance management apparatus are as follows.

The control interface agent is configured to 1. receive a control interface request of a virtual region of the hosted cloud that is sent by a client of a user, forward a cloud service information request in the control interface request of the virtual region of the hosted cloud that is sent by the client of the user to the control interface management system of the allied cloud, and forward a page static file request in the control interface request of the virtual region of the hosted cloud that is sent by the client of the user to the control interface management system of the hosted cloud, 2. obtain a cloud service information response provided by the allied cloud, and obtain a page static file response provided by the hosted cloud, 3. interact, by the control interface agent, with the authentication system of the allied cloud and the federation agent, to obtain authentication of the allied cloud to a shadow account, corresponding to a mother account in the hosted cloud, in the allied cloud, 4. replace a control interface domain name, of a region of the allied cloud, in the cloud service information response with a corresponding control interface domain name of the virtual region of the hosted cloud, and combine a cloud service information response that is obtained after the replacement and that is provided by the allied cloud and the page static file response of a control interface of the hosted cloud into a control interface response to be returned to the client of the user.

The control interface agent is set in the cloud federation, so that the user can use the cloud service of the region of the allied cloud by using the control interface, and a visual sense and a processing manner perceived by the user when using the cloud service of the region of the allied cloud are the same as that perceived by the user when using the cloud service of the region of the hosted cloud. In the cloud federation, control interface agents are set at different locations in the hosted cloud, the allied cloud, or the third-party data center, so that locations of the control interface agents adapt to positions of different users, communication between the user and the control interface agent becomes faster, and efficiency of providing a control interface response by the cloud federation is improved.

The federation agent is configured to 1. log in to an agent account in the allied cloud based on an account name and a password of the agent account, to obtain an agent contract identifier, 2. interact with the control interface agent, the API agent, the service detail record agent, and the authentication system of the allied cloud, write the agent contract identifier into a request to be sent to the allied cloud, and send the request with the agent contract identifier to the allied cloud, to obtain a corresponding response.

The federation agent is set in the cloud federation, so that a problem of user authentication in the allied cloud is resolved, the user is imperceptible to authentication in the allied cloud, and security of user authentication is further ensured by using the federation agent.

The API agent is configured to 1. receive an API request of a virtual region of the hosted cloud that is sent by a client of a user, forward the API request of the virtual region of the hosted cloud that is sent by the client of the user to the API endpoint of the region of the allied cloud, 2. interact, by the API agent with the federation agent, to obtain authentication of the allied cloud to a shadow account, corresponding to an account in the hosted cloud, in the allied cloud, 3. replace an API endpoint domain name of the region of the allied cloud in an API response of the allied cloud with a corresponding API endpoint domain name of the virtual region of the hosted cloud, 4. return an API response obtained after the replacement to the client of the user.

The API agent is set in the cloud federation, so that the user can use the cloud service of the region of the allied cloud in a manner of invoking an API. The user has same perception of a visual sense and a processing manner when using the cloud service of the region of the allied cloud and when using the cloud service of the region of the hosted cloud.

The service detail record agent is configured to 1. interact with the BSS of each of the hosted cloud and the allied cloud, and synchronize a cloud service service detail record of a shadow account to a service detail record storage unit, 2. forward a service stop request sent by the BSS of the hosted cloud to the BSS of the allied cloud, 3. interact, by the service detail record agent, with the hosted cloud and the federation agent, to obtain authentication of the allied cloud to a shadow account, corresponding to an account in the hosted cloud, in the allied cloud.

The service detail record agent is set in the cloud federation, so that the user can perform unified settlement only with the hosted cloud on fees generated for cloud services (including a cloud service of the hosted cloud and a cloud service of the allied cloud) used in the cloud federation. The service detail record agent also ensures that the hosted cloud and the allied cloud maintain a same service stop state for a same defaulting user, to ensure stability of the cloud federation.

The OSS agent is configured to forward a worksheet, an email, and the like of a shadow account in the allied cloud to the OSS of the hosted cloud.

The OSS agent is set in the cloud federation, so that operation and maintenance capabilities of the cloud federation can be unified, stability of the cloud federation is ensured, and unified operation and maintenance experience is provided for the user.

The user of the hosted cloud can obtain, by using the alliance management apparatus, a cloud service response of the region of the allied cloud by using a mother account or an account registered with the hosted cloud, and perform unified settlement with the hosted cloud on bills of an obtained cloud service. A specific procedure in which the user perceives no difference when accessing a cloud service of the region of the allied cloud in the cloud federation includes registering, by the user, an account with the hosted cloud, using the cloud service of the region of the allied cloud in different manners (by using a control interface or an API), and performing settlement on fees of an obtained cloud service response. In the foregoing procedure, the modules in the alliance management apparatus perform different operations to implement different functions.

The user registers a mother account with the hosted cloud, and the hosted cloud registers a shadow account with the allied cloud for the user.

When the cloud federation is built, a federated identity needs to be pre-configured for the hosted cloud and the allied cloud. Specifically, the hosted cloud registers an agent account with the allied cloud, the agent account includes an agent contract identifier, and the agent contract identifier is a permission identifier used by the user of the hosted cloud to process the cloud service of the allied cloud. An account name and a password of the agent account are stored by the federation agent, and the federation agent is configured to perform account registration, and authentication in the allied cloud for the user of the hosted cloud.

Figure 4:
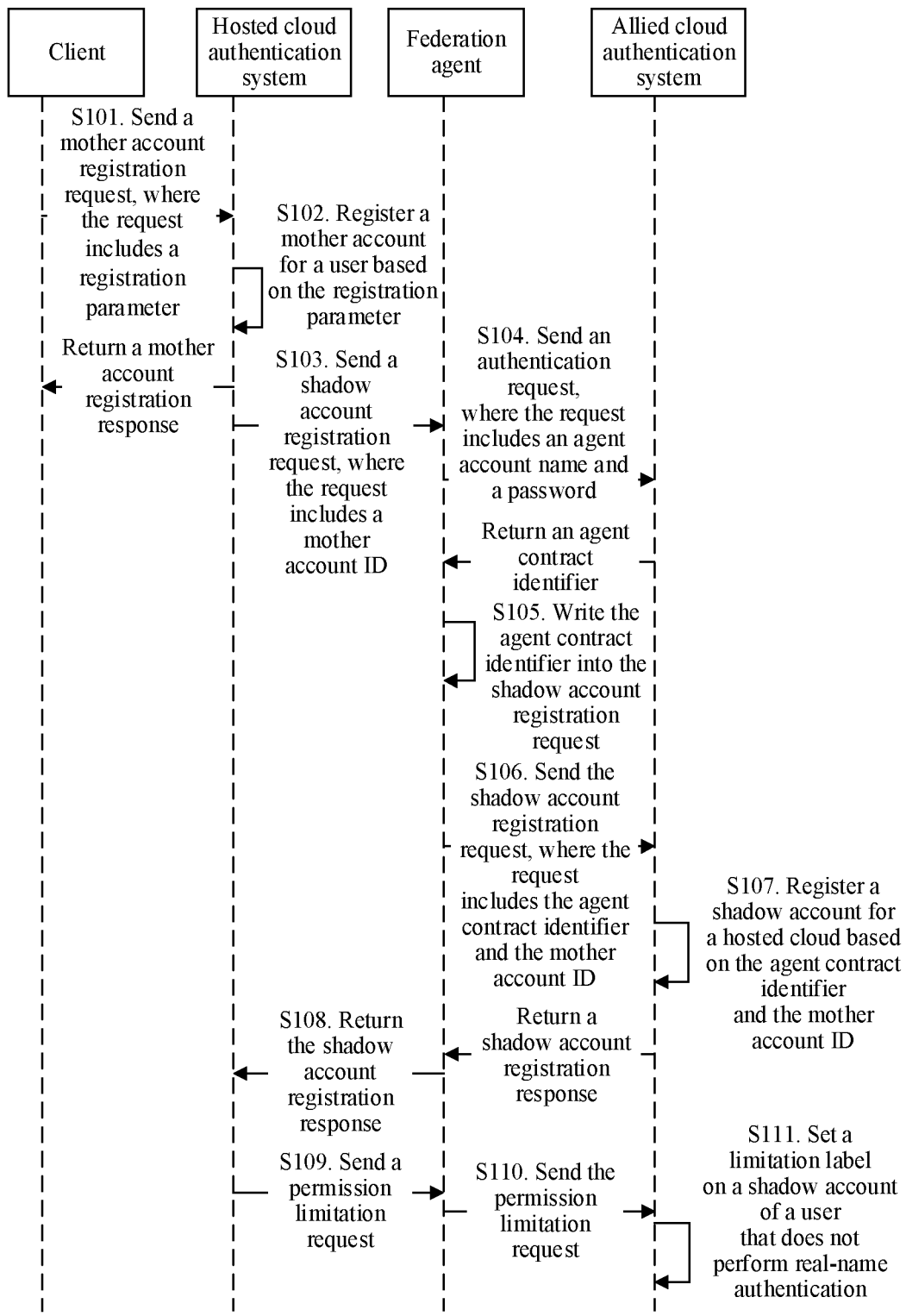
FIG. 4 is a schematic flowchart of registering a shadow account with an allied cloud by a hosted cloud according to an embodiment of this application.

With reference to FIG. 4, the following describes a procedure in which a hosted cloud registers a shadow account with an allied cloud for a user according to an embodiment of this application.

S101. The user sends a mother account registration request to the hosted cloud by using a client, where the request includes a registration parameter, and the registration parameter includes any one or more of the following an account name, identity information, a verification code, a password, a mailbox, and the like.

S102. A hosted cloud authentication system receives the mother account registration request, and registers a mother account with the hosted cloud for the user based on the registration parameter carried in the request, where the mother account includes a mother account identifier, each mother account has a different mother account identifier, and the mother account identifier may be used to uniquely represent a mother account corresponding to the mother account identifier. The hosted cloud authentication system returns a mother account registration response to the client of the user. In this case, the user successfully registers the mother account with the hosted cloud.

S103. The hosted cloud authentication system sends, to a federation agent, a request for registering a shadow account with the allied cloud for the mother account, where the request carries the mother account identifier and a hosted cloud identifier.

S104. The federation agent receives the shadow account registration request, and sends an authentication request to an allied cloud authentication system, where the request includes an account name and a password of an agent account, and the account name and the password of the agent account are pre-stored in the federation agent when a cloud federation is built. The allied cloud authentication system returns an agent contract identifier to the federation agent based on the account name and the password of the agent account.

S105. The federation agent writes the agent contract identifier into the shadow account registration request.

S106. The federation agent sends the shadow account registration request with the agent contract identifier, the mother account identifier, and the hosted cloud identifier to the allied cloud authentication system.

S107. The allied cloud authentication system authenticates the mother account in the hosted cloud based on the agent contract identifier in the received shadow account registration request, and registers a shadow account with the allied cloud for the mother account, where the shadow account includes the mother account identifier and the hosted cloud identifier. The allied cloud authentication system returns a shadow account registration response to the federation agent.

S108. The federation agent further returns the shadow account registration response to the hosted cloud.

Optionally, the procedure further includes steps S109 to S111.

S109. The hosted cloud authentication system sets a permission limitation label for a user that does not perform real-name authentication when the user registers a mother account with the hosted cloud, where the permission limitation label is used to limit permission of the mother account to use some cloud services in the hosted cloud, and the hosted cloud authentication system further sends, to the federation agent, a request for limiting permission of a shadow account in the allied cloud for the user that does not perform real-name authentication.

S110. The federation agent forwards the request to the allied cloud authentication system.

S111. The allied cloud authentication system sets a permission limitation label for the shadow account in the allied cloud for the user that does not perform real-name authentication, so that the shadow account in the allied cloud and the corresponding mother account in the hosted cloud have same cloud service usage permission in the hosted cloud and in the allied cloud.

Optionally, after successfully registering the mother account with the hosted cloud, the user can log in to the mother account in the hosted cloud, and create at least one account under the mother account in the hosted cloud authentication system for another subuser of the user, where the mother account has management rights to an account under the mother account.

The user processes a cloud service of a region of the allied cloud by using a control interface.

Figure 5:
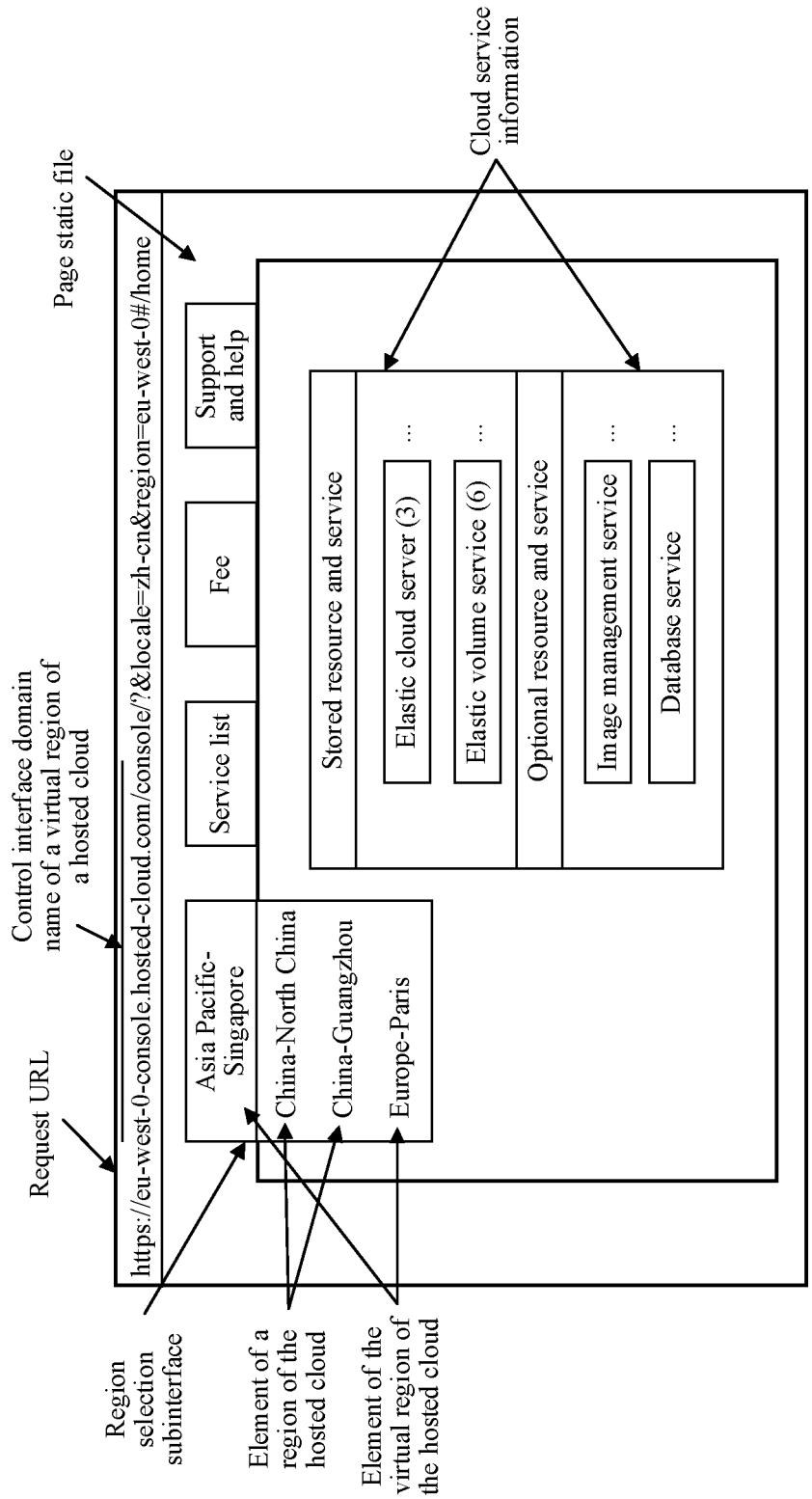
FIG. 5 is a schematic diagram of a control interface according to an embodiment of this application.

In the cloud federation, the user can enter, by using a control interface domain name, a control interface of a region of the hosted cloud or a control interface of a virtual region of the hosted cloud, and the control interface is a user interface (UI) interface on which the user may send a control interface request and receive a control interface response. The control interface of the region of the hosted cloud and the control interface of the virtual region of the hosted cloud have a same style (each has a style of the hosted cloud). For example, the control interface of the region of the hosted cloud and the control interface of the virtual region of the hosted cloud each display an identifier, a framework, and a color of the hosted cloud. The control interface of the region of the hosted cloud and the control interface of the virtual region of the hosted cloud each provide a region selection subinterface. The region selection subinterface includes an element of the region of the hosted cloud and an element of the virtual region. For example, the elements are a name of the region of the hosted cloud and a name of the virtual region. FIG. 5 is a schematic diagram of a control interface of the virtual region of the hosted cloud. As shown in FIG. 5, there are an element (China-North China, China-Guangzhou) of the region of the hosted cloud and an element (Asia Pacific-Singapore, Europe-Paris) of the virtual region of the hosted cloud in a region selection subinterface of the control interface. A control interface on which there is an element Asia Pacific-Singapore of the virtual region of the hosted cloud is currently displayed. A page static file of the control interface is a page static file provided by the hosted cloud. A request URL of the control interface includes a control interface domain name eu-west-0-console.hosted-cloud.com of the virtual region of the hosted cloud. Cloud service information (content of stored resources and services and content of optional resources and services) of the region is displayed on the control interface, and the cloud service information is dynamic cloud service information provided by the allied cloud.

The virtual region is mapped by a region of the allied cloud in the hosted cloud. When the cloud federation is built, the hosted cloud obtains a control interface domain name of the region of the allied cloud in advance, generates a control interface domain name of the virtual region of the hosted cloud based on the control interface domain name of the region of the allied cloud, and registers the control interface domain name of the virtual region of the hosted cloud in an internet DNS, and the control interface domain name corresponds to an IP address of a control interface agent in the DNS.

Optionally, a plurality of control interface agents may be deployed. The hosted cloud may register a control interface domain name of the virtual region of the hosted cloud in the DNS to be corresponding to IP addresses of a plurality of control interface agents. According to the foregoing method, when user access traffic is high, the plurality of control interface agents balance the user access traffic, to accelerate user access. In addition, when the user accesses a control interface domain name of a specific virtual region, the DNS may intelligently select an IP address of a control interface agent closer to an IP address of the user, also accelerating user access.

The foregoing method in which the hosted cloud generates the control interface domain name of the virtual region of the hosted cloud based on the control interface domain name of the region of the allied cloud may be that the hosted cloud converts the control interface domain name of the region of the allied cloud into the control interface domain name of the virtual region of the hosted cloud according to a domain name rule.

In an embodiment, according to the domain name rule, each control interface domain name includes a first part and a second part, where the first part includes an identifier of a cloud in which a region indicated by the control interface domain name is located, and the second part includes an identifier of the region indicated by the control interface domain name. The control interface domain name of the virtual region of the hosted cloud is mapped by the control interface domain name of the region of the allied cloud. Each control interface domain name of the virtual region of the hosted cloud is in a one-to-one correspondence with each control interface domain name of the region of the allied cloud. Each control interface domain name of the virtual region of the hosted cloud and a corresponding control interface domain name of the region of the allied cloud have different first parts. The first part of the control interface domain name of the virtual region of the hosted cloud includes an identifier of the hosted cloud, and the first part of the control interface domain name of the region of the allied cloud includes an identifier of the allied cloud. Each control interface domain name of the virtual region of the hosted cloud and a corresponding control interface domain name of the region of the allied cloud have same or corresponding second parts, and the second parts each are used to indicate information about a corresponding region indicated by the control interface domain name. For example, there are a cloud A established by a cloud service provider A and a cloud B established by a cloud service provider B in a cloud federation. The cloud A and the cloud B are in an alliance relationship. For a user that registers a mother account with the cloud A, the cloud A is the hosted cloud, and the cloud B is the allied cloud. A control interface domain name of a region of the allied cloud, namely the cloud B, is eu-west-0-console.B-cloud.com, and a control interface domain name that is of the virtual region of the hosted cloud, namely the cloud A, and that is registered by the hosted cloud, namely the cloud A, with the DNS based on the control interface domain name of the region of the allied cloud, namely the cloud B, is eu-west-0-console.A-cloud.com. The first part (namely, A-cloud) of the control interface domain name of the virtual region of the hosted cloud, namely the cloud A, is different from a first part (namely, B-cloud) of the control interface domain name of the corresponding region of the allied cloud, namely the cloud B. The two first parts respectively indicate an identifier of the hosted cloud, namely the cloud A, and an identifier of the allied cloud, namely the cloud B. However, second parts of the two domain names are the same as each other or corresponding to each other, in other words, identifiers of regions indicated by the second parts are the same as each other or corresponding to each other. The first part (namely, A-cloud) of the control interface domain name of the virtual region of the hosted cloud, namely the cloud A, is the same as or corresponding to an original control interface domain name of a region of the hosted cloud, namely the cloud A, and both of the first parts of the control interface domain names indicate the identifier of the hosted cloud, namely the cloud A.

When a user accesses a region or a virtual region of the hosted cloud, the hosted cloud provides a management interface for a client of the user. The management interface may be a control interface of a default region of the hosted cloud, or may be a region management interface specifically designed by the hosted cloud for the user to select a region. The management interface includes a region selection subinterface, and the region selection subinterface may be displayed on the management interface in a form of a short-cut menu or a pop-up window. Each region selection subinterface includes an element of a region of the hosted cloud and an element of a virtual region of the hosted cloud. The element of the region of the hosted cloud is configured by a control interface management system of the hosted cloud to be corresponding to a control interface domain name of the region of the hosted cloud. As shown in FIG. 5, the user selects the element of the region of the hosted cloud on the region selection subinterface, and the client of the user generates a control interface request of the region of the hosted cloud. The control interface request is sent to the control interface management system of the hosted cloud based on the control interface domain name of the region of the hosted cloud, and the control interface management system of the hosted cloud receives the control interface request, and returns a control interface response. The element of the virtual region of the hosted cloud is configured by a control interface agent to be corresponding to a control interface domain name of the virtual region of the hosted cloud. As shown in FIG. 5, the user selects the element of the virtual region of the hosted cloud on the region selection subinterface, and the client of the user generates a control interface request of the virtual region of the hosted cloud. The control interface request is sent to the control interface agent based on the control interface domain name of the virtual region of the hosted cloud. The control interface agent further obtains, from the hosted cloud based on a page static file request in the control interface request, a page static file provided by the hosted cloud, and obtains, from the allied cloud based on a cloud service information request in the control interface request, cloud service information provided by the allied cloud. The control interface agent combines the page static file and the cloud service information into a control interface response to be returned to the client of the user.

Figure 6:
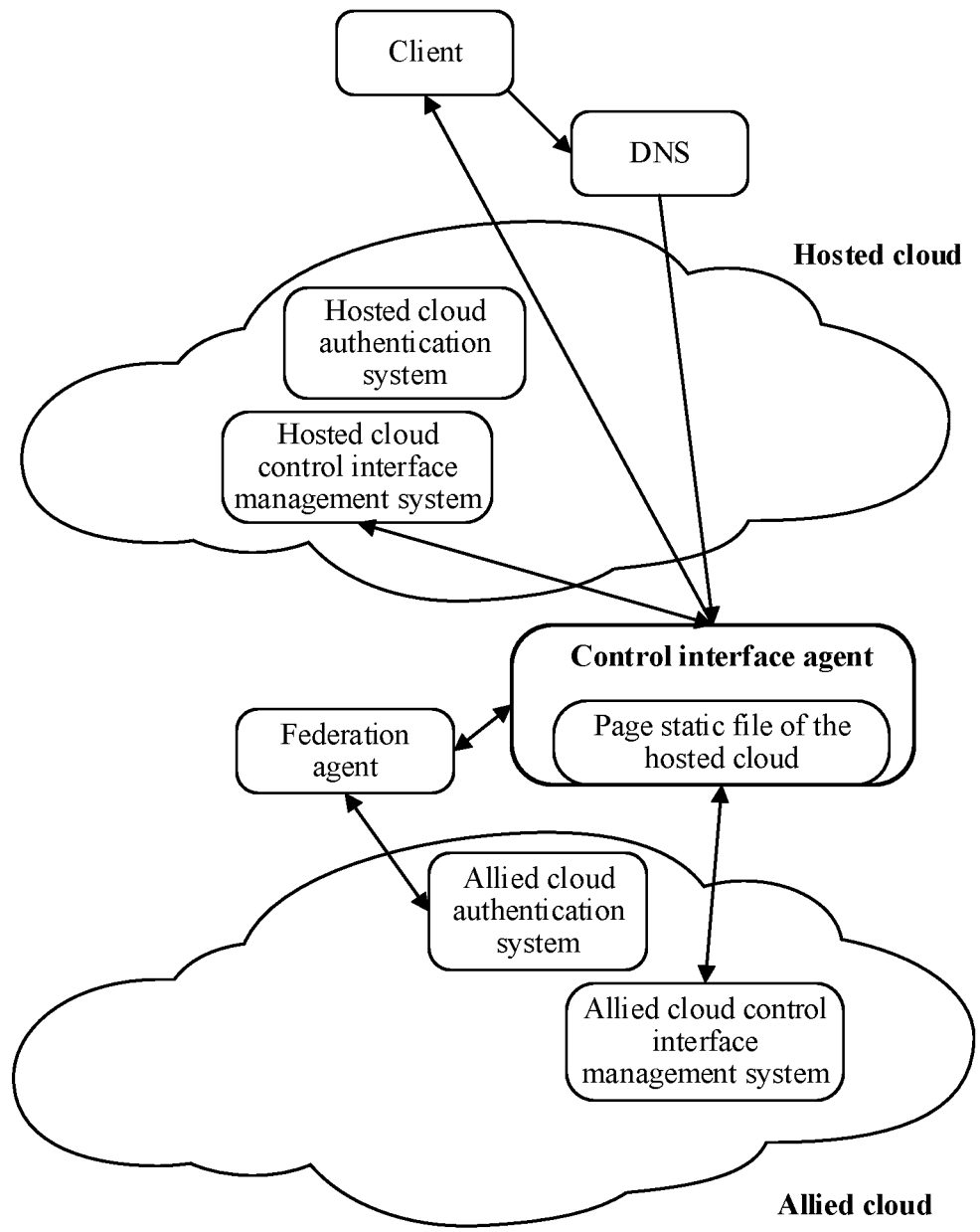
FIG. 6 is a schematic diagram of application of a control interface agent in a cloud federation according to an embodiment of this application.

FIG. 6 is a schematic diagram of an application scenario of a control interface agent in a cloud federation. The control interface agent interacts with a client, a federation agent, and a control interface management system of an allied cloud, to process a cloud service of a region of the allied cloud for a user. The processing the cloud service of the region of the allied cloud includes creating, modifying, deleting, adding, restarting, stopping, querying, and managing a cloud service of the region of the allied cloud. The control interface agent obtains, in advance, information such as a correspondence between a control interface domain name of a virtual region of a hosted cloud and a control interface domain name of a region of the allied cloud. The control interface agent interacts with the federation agent and an allied cloud authentication system based on a control interface request that is sent by the client of the user and that is received by the control interface agent, so that the user obtains authentication of the allied cloud, and the control interface agent further forwards a page static file request in the control interface request to the hosted cloud based on a static file server domain name of the hosted cloud, and forwards a cloud service information request in the control interface request to the allied cloud based on the control interface domain name of the region of the allied cloud.

Figure 7:
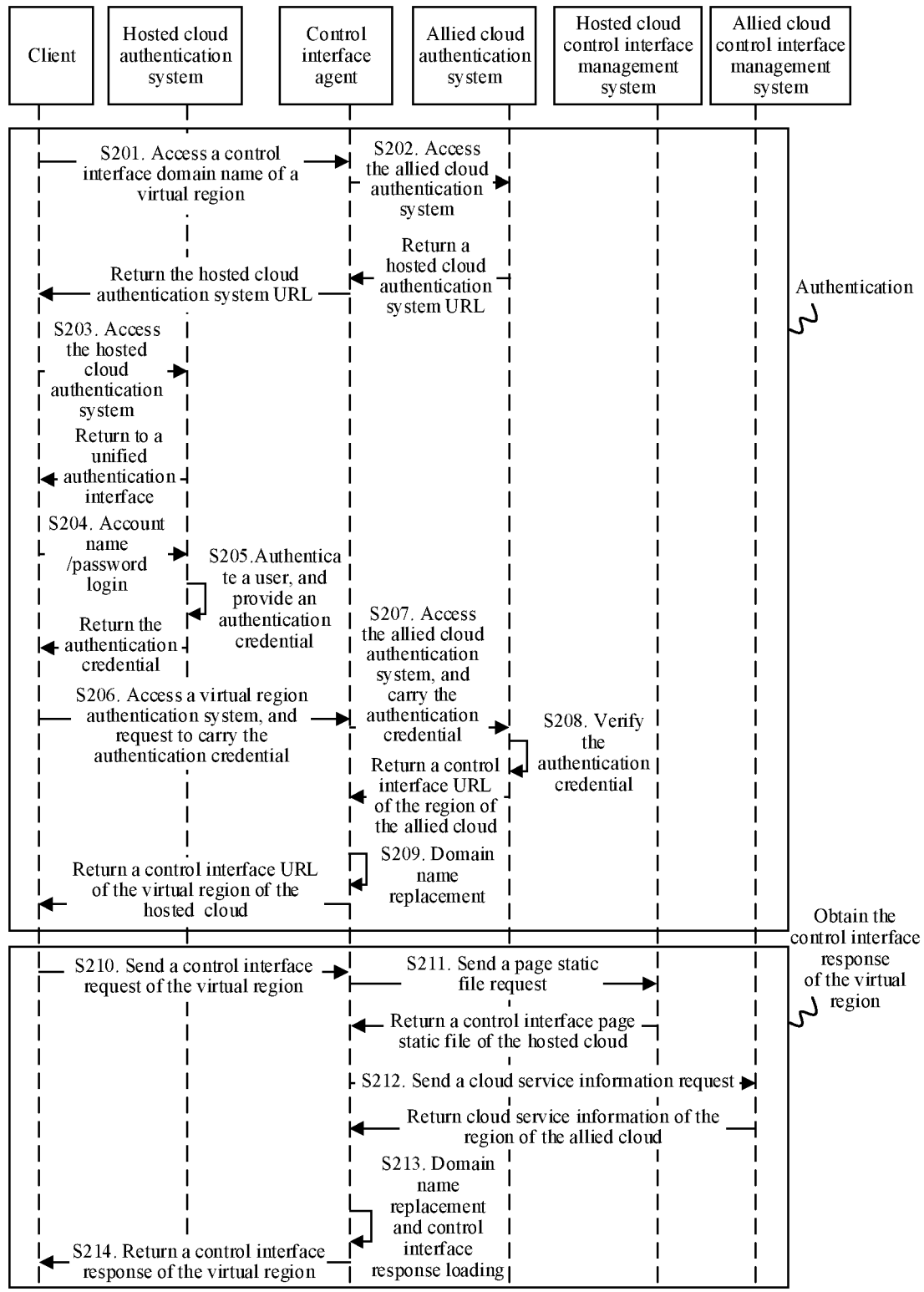
FIG. 7 is a schematic flowchart of accessing an allied cloud by a user by using a control interface according to an embodiment of this application.

In this application, a federated identity is pre-configured for the hosted cloud and the allied cloud when the cloud federation is built. Specifically, the hosted cloud and the allied cloud exchange metadata through the federation agent. In other words, metadata of the allied cloud is stored in an authentication system of the hosted cloud, and metadata of the hosted cloud is stored in an authentication system of the allied cloud. The metadata of the hosted cloud and the allied cloud include identifiers, security certificates, public keys, protocols, and names and addresses of the authentication systems of respective clouds. The hosted cloud and the allied cloud provide a single sign-on function for a user by using a unified authentication mechanism. In other words, the user only needs to log in to a unified identify authentication platform of the hosted cloud by using an account name and a password of the hosted cloud, to process a cloud service of the region of the hosted cloud and a cloud service of the region of the allied cloud. The unified authentication mechanism is not limited. For example, the hosted cloud and the allied cloud provide a unified authentication service for the user by using a single sign-on unified authentication mechanism based on a security assertion markup language (SAML) 2.0. FIG. 7 shows a procedure in which a user accesses a control interface domain name of a virtual region by using a client, to obtain cloud service information of an allied cloud. Specific steps of the procedure are as follows.

S201. The user accesses a control interface domain name of a virtual region of a hosted cloud by using the client.

Because a region and a virtual region of the hosted cloud each have an independent control interface domain name, the user can directly access the control interface domain name of the virtual region of the hosted cloud to access the region of the hosted cloud (for example, directly access Https://eu-west-console.hosted-cloud.com).

Optionally, in step S201, the user may alternatively access a public website of the hosted cloud, for example, a homepage website of the hosted cloud, and log in to, by using an account name and a password in the hosted cloud, a unified authentication platform provided by the hosted cloud. The user first accesses a management interface of the hosted cloud (for example, a control interface of a default region of the hosted cloud), then selects, on a region selection subinterface of the management interface, a control interface of a region that the user wants to access. For example, the user accesses a domain name Https://www.hosted-cloud.com of a cloud service provider by using a browser of the client, and logs in by using the account name and the password in the hosted cloud, to enter a management interface corresponding to the domain name, and the user may independently select, on a region selection subinterface on this page, a region that the user wants to access. In this way, a control interface domain name accessed by the user switches to a control interface domain name of a region that the user really wants to access.

S202. A control interface agent receives the control interface request, and returns a URL of an authentication system of the hosted cloud to the client, where the control interface request is used to access a virtual region, that is, used to access a region of the allied cloud.

Specifically, the control interface agent sends an authentication request to an allied cloud authentication system based on the control interface request of the virtual region by using a federation agent, and the allied cloud authentication system receives the authentication request, and returns the URL of the authentication system of the hosted cloud. Because a federated identity is pre-configured for the hosted cloud and the allied cloud, the allied cloud delegates an operation of authenticating the user to the hosted cloud authentication system. The control interface agent further returns the URL of the authentication system of the hosted cloud to the browser.

S203. The client accesses the hosted cloud authentication system based on the URL of the authentication system of the hosted cloud, and the hosted cloud authentication system presents an interface of a unified sign-on platform to the user by using the client.

S204. The user logs in by using the account name and the password in the hosted cloud.

S205. The hosted cloud authentication system authenticates the user by using the account name and the password that are submitted by the user, provides an authentication credential for the client, and sends the URL of the authentication system of the virtual region to the client. The authentication credential is an identifier that is provided after the user is authenticated by the hosted cloud authentication system and that is used to allow the user to process a cloud service of the hosted cloud. Because the federated identity is pre-configured for the hosted cloud and the allied cloud, the allied cloud trusts the authentication credential provided by the hosted cloud for the client of the user, and the allied cloud only needs to verify that the authentication credential provided by the hosted cloud for the user is real and effective, to allow the user to process a cloud service of the allied cloud.

S206. After the user is authenticated, the client sends the authentication credential of the user to the control interface agent based on the URL of the authentication system of the virtual region.

Optionally, before step S203, if the user logs in by using the account name and the password in the hosted cloud, and is authenticated in the hosted cloud, the client has stored the authentication credential of the user, steps S203 to S205 do not need to be performed, step S206 is directly performed after step S202, and the client sends the stored authentication credential of the user to the control interface agent.

S207. The control interface agent sends the authentication credential of the user to the allied cloud authentication system.

S208. The allied cloud authentication system verifies authenticity of the received authentication credential based on the metadata of the hosted cloud that is stored when the federated identity is pre-configured, determines that the authentication credential is authentic, and returns a control interface URL of a region of the allied cloud to the control interface agent.

S209. The control interface agent replaces a control interface domain name of the region of the allied cloud in the received control interface URL of the region of the allied cloud with the control interface domain name of the virtual region of the hosted cloud, and the control interface agent returns a control interface URL obtained after the replacement to the client.

S210. The client sends the control interface request of the virtual region by using the control interface URL obtained after the replacement.

S211. The control interface agent receives the control interface request of the virtual region, generates a page static file request and a cloud service information request based on the control interface request. The method in which the control interface agent generates the page static file request based on the control interface request is that the control interface agent generates a request URL in a page static file request based on an address, pre-configured for the virtual region, of a page static file server of the hosted cloud, extracts a common request parameter and a page static file request parameter from the control interface request, to generate a request parameter in the page static file request, and combines the request URL and the request parameter into the page static file request. The control interface agent sends the page static file request to the hosted cloud, and the control interface agent obtains a page static file response of a control interface of the hosted cloud from the hosted cloud and stores the page static file response, where the page static file response of the control interface includes various page static files, including a framework file, a cascading style sheet (CSS), a JAVASCRIPT (JS), an image file, and the like of the control interface, required for building the control interface on the client.

Optionally, because a page static file of the hosted cloud generally does not change frequently, and before step S211, if the control interface agent has obtained the page static file of the hosted cloud, in step S211, the control interface agent may locally obtain a pre-stored page static file of the hosted cloud, and does not need to forward the page static file request to the hosted cloud.

The method in which the control interface agent generates the cloud service information request based on the control interface request is that the control interface agent replaces, based on a pre-configured domain name rule, the control interface domain name of the virtual region in the request URL in the control interface request with a control interface domain name of a region of the allied cloud, or that the control interface agent queries a configuration information table, to obtain a control interface domain name, of a region of the allied cloud, corresponding to the control interface domain name of the virtual region in the request URL of the control interface request, replaces the control interface domain name of the virtual region in the request URL in the control interface request with the obtained control interface domain name of the region of the allied cloud, to generate a request URL in the cloud service information request, extracts a common request parameter and a cloud service information request parameter from the control interface request, to generate a request parameter in the cloud service information request, and combines the request URL and the request parameter into the cloud service information request.

S212. The control interface agent forwards the cloud service information request to a control interface management system of the allied cloud, the control interface management system of the allied cloud receives the cloud service information request, and obtains a corresponding cloud service information response, where the cloud service information response includes cloud service information (for example, information such as a type of a cloud service that has been applied by the user in the region of the allied cloud, a quantity of cloud services of each type, and a running time) and the control interface domain name of the region of the allied cloud. The control interface management system of the allied cloud returns the cloud service information response to the control interface agent.

Optionally, a sequence of the operations performed by the control interface agent in steps S211 and S212 is not limited, and the operations may be alternatively performed simultaneously.

S213. The control interface agent performs response replacement and response loading for the cloud service information returned by the allied cloud and the static file response, of the control interface, provided by the hosted cloud, and returns a response obtained after the response replacement and response loading to the client of the user. The response replacement includes replacing the control interface domain name of the region of the allied cloud that is included in the cloud service information response of the allied cloud with the corresponding control interface domain name of the virtual region of the hosted cloud, to obtain a cloud service response, of the allied cloud, obtained after the replacement, and the response loading includes combining the page static file of the control interface of the hosted cloud and the cloud service response, of the allied cloud, obtained after the replacement, and loading the combined response into a control interface response.

S214. Return the control interface response to the user.

The foregoing steps S201 to S214 are performed, the user has same experience and feeling in accessing the cloud service of the region of the allied cloud by accessing the control interface domain name of the virtual region and accessing the cloud service of the region of the hosted cloud by accessing the control interface domain name of the region of the hosted cloud. In other words, when the user uses the cloud service, the user does not know whether a region that provides the service for the user belongs to the hosted cloud or the allied cloud, and the user perceives no difference when using the cloud service across clouds.

After the foregoing steps S201 to S209 are performed, that is, authentication of the user in the hosted cloud and the allied cloud is completed. Within a fixed time limit, the client stores the authentication credential, and the user can directly perform steps S210 to S214, and can select and use various cloud services on the control interface.

The user processes the cloud service of the region of the allied cloud by using an API request.

In this application, the user may alternatively process a cloud service of the region of the hosted cloud or the region of the allied cloud by using a cloud service API request.

In this application, when the client of the user sends the cloud service API request to a cloud service API endpoint domain name of the virtual region, the cloud service API request is received by an API agent in an alliance management apparatus. The API agent replaces the cloud service API endpoint domain name of the virtual region in the cloud service API request with a cloud service API endpoint domain name of the region of the allied cloud, and forwards a cloud service API request obtained after the replacement to the cloud service API endpoint domain name of the region of the allied cloud. Finally, the user obtains a cloud service API response of the region of the allied cloud.

The API request includes a request URL and a request parameter. The request URL is also referred to as a website address. The request URL includes a protocol used for transmission on demand, a target API endpoint domain name, a resource path, and the like. The target API endpoint domain name is used to indicate a domain name or an address of a server on which an API endpoint that the API request needs to arrive is located. The request parameter includes a particular processing request parameter and a common request parameter, and the particular processing request parameter is used to indicate a name, a specification, and a format of a cloud service to be processed. The API response is a result or indication of the API request. Each API response is in a one-to-one correspondence with each API request. The API response includes one or any more of a response parameter, a request source address, and a response resource link. The response parameter indicates information or an indication that is requested by the API request, the request source address is used to provided information about a path on which the API response is returned to a sending location of the API request, the response resource link is used to indicate a location in which the response resource is located, and the response resource link includes an API endpoint domain name.

Figure 8:
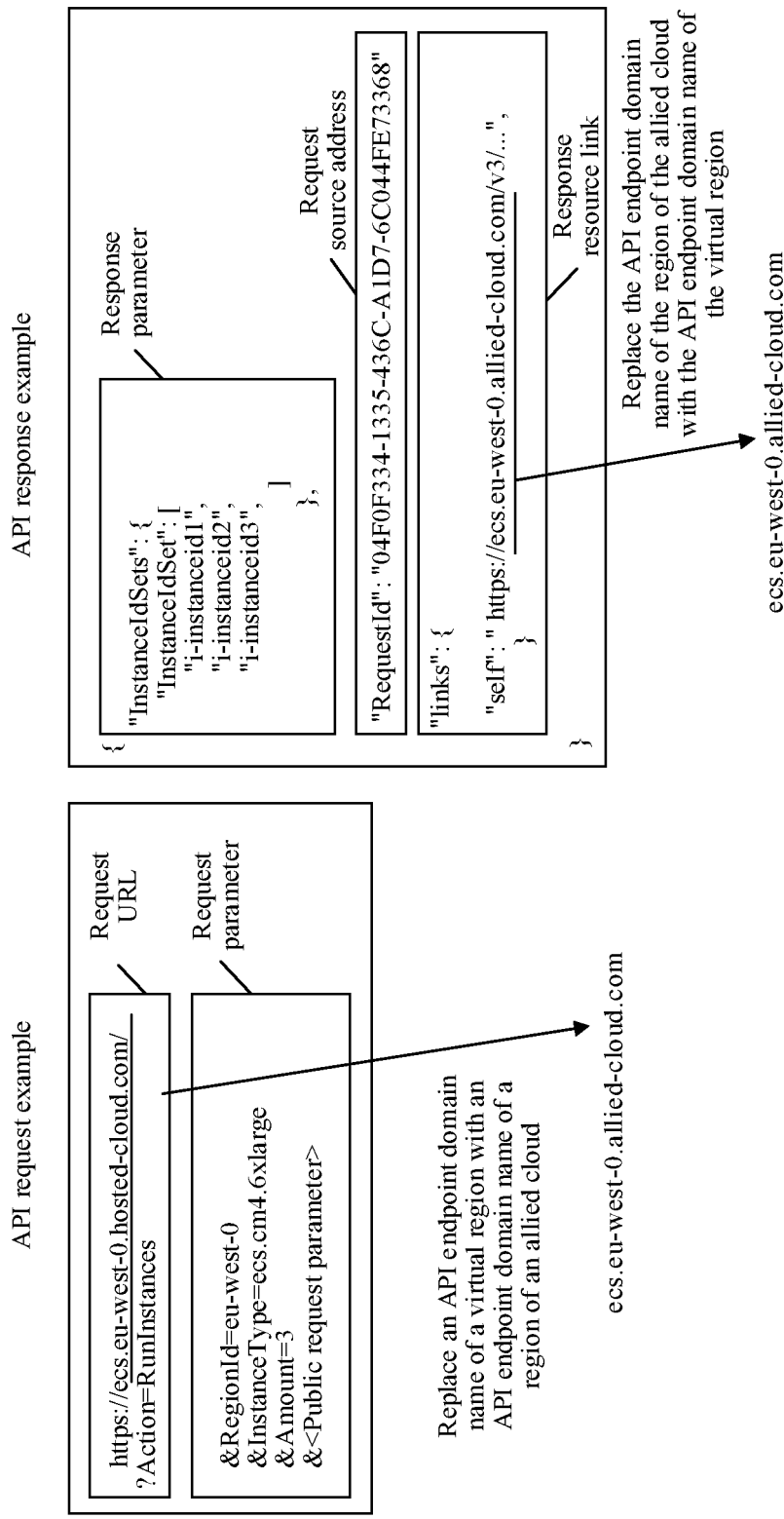
FIG. 8 is a schematic diagram of a group of an API request and a response according to an embodiment of this application.

FIG. 8 is a schematic diagram of a group of an API request sent to an API endpoint domain name of a virtual region and an API response returned from an API endpoint domain name of a region of an allied cloud. Content of an API request of a cloud service of the virtual region is running an elastic cloud server (ecs) (a virtual machine service) in a virtual region of a hosted cloud. A target API endpoint domain name included in a request URL in the API request is a cloud service API endpoint domain name ecs.eu-west-0.hosted-cloud.com of the virtual region of the hosted cloud, and a request parameter of the API request specifically indicates information such as a quantity and a type of virtual machines to be run. An API agent receives the API request, and replaces the target API endpoint domain name in the request URL from the cloud service API domain name of the virtual region of the hosted cloud to a cloud service API endpoint domain name ecs.eu-west-0.allied-cloud.com of the region of the allied cloud, to obtain an API request obtained after the replacement. The API agent forwards, based on the request URL in the API request obtained after the replacement, the API request obtained after the replacement to a cloud service API endpoint of the region of the allied cloud. The cloud service API endpoint of the region of the allied cloud returns an API response to the API agent. The API agent queries whether the API response includes a response resource link, if the API response includes a response resource link, the API agent replaces the API endpoint domain name of the region of the allied cloud in the response resource link with the API endpoint domain name of the virtual region, and forwards an API response obtained after the replacement to the user. Therefore, when the user creates the API request of the virtual region and receives the API response, an API endpoint domain name used and perceived by the user is the API endpoint domain name of the virtual region, in other words, the API endpoint domain name of the virtual region has a style the same as an API endpoint domain name of the hosted cloud, and the user has a same feeling in API access to the virtual region of the hosted cloud and API access to the region of the hosted cloud.

In a cloud federation, each API endpoint domain name includes a first part and a second part. The first part includes an identifier of a cloud in which a region indicated by the API endpoint domain name is located, and the second part includes an identifier of the region indicated by the API endpoint domain name. API endpoint domain names of different cloud services are usually different, and each API endpoint domain name may further include a third part. The third part includes a cloud service identifier corresponding to the API endpoint domain name. For example, "ecs" in the foregoing example represents an elastic computing service.

When the cloud federation is built, the hosted cloud obtains the API endpoint domain name of the region of the allied cloud in advance, generates the API endpoint domain name of the virtual region of the hosted cloud based on the API endpoint domain name of the region of the allied cloud, and registers the API endpoint domain name of the virtual region of the hosted cloud with the DNS, where the API endpoint domain name of the virtual region of the hosted cloud corresponds to an IP address of the API agent. The API endpoint domain name of the virtual region of the hosted cloud is mapped by the API endpoint domain name of the region of the allied cloud in the hosted cloud, each API endpoint domain name of the virtual region of the hosted cloud is in a one-to-one correspondence with each API endpoint domain name of the region of the allied cloud.

The foregoing method in which the hosted cloud generates the API endpoint domain name of the virtual region of the hosted cloud based on the API endpoint domain name of the region of the allied cloud may be that the hosted cloud converts, based on a domain name rule, the API endpoint domain name of the region of the allied cloud into the API endpoint domain name of the virtual region of the hosted cloud.

Each API endpoint domain name of the virtual region of the hosted cloud and a corresponding API endpoint domain name of the region of the allied cloud have different first parts. The first part of the API endpoint domain name of the virtual region of the hosted cloud includes an identifier of the hosted cloud, and the first part of the API endpoint domain name of the region of the allied cloud includes an identifier of the allied cloud. Each API endpoint domain name of the virtual region of the hosted cloud and a corresponding API endpoint domain name of the region of the allied cloud have same or corresponding second parts, and the second parts each are used to indicate information about a region indicated by the API endpoint domain name. For example, there are a cloud A established by a cloud service provider A and a cloud B established by a cloud service provider B in a cloud federation. The cloud A and the cloud B are in an alliance relationship. For a user that registers a mother account with the cloud A, the cloud A is the hosted cloud, and the cloud B is the allied cloud. An API endpoint domain name of a specific region of the allied cloud, namely the cloud B, is service.regionN.B-cloud.com, and a cloud service API endpoint domain name that is of a virtual region N of the hosted cloud, namely the cloud A, and that is registered by the hosted cloud, namely the cloud A, with a DNS based on a cloud service API endpoint domain name of a region N of the allied cloud, namely the cloud B, is service.regionN.A-cloud.com. A first part (namely, A-cloud) of the cloud service API endpoint domain name of the virtual region N of the hosted cloud, namely the cloud A, is different from a first part (namely, B-cloud) of the cloud service API endpoint domain name of the corresponding region N of the allied cloud, namely the cloud B. The first parts respectively indicate an identifier of the hosted cloud, namely the cloud A, and an identifier of the allied cloud, namely the cloud B. However, second parts of the two domain names are the same as each other or corresponding to each other, in other words, identifiers of regions indicated by the second parts are the same as each other or corresponding to each other. The first part (namely, A-cloud) of the cloud service API endpoint domain name of the virtual region N of the hosted cloud, namely the cloud A, is the same as or corresponding to a first part of a cloud service API endpoint domain name of an original region of the hosted cloud, namely the cloud A, and the first parts each include the identifier of the hosted cloud, namely the cloud A.

Figure 9:
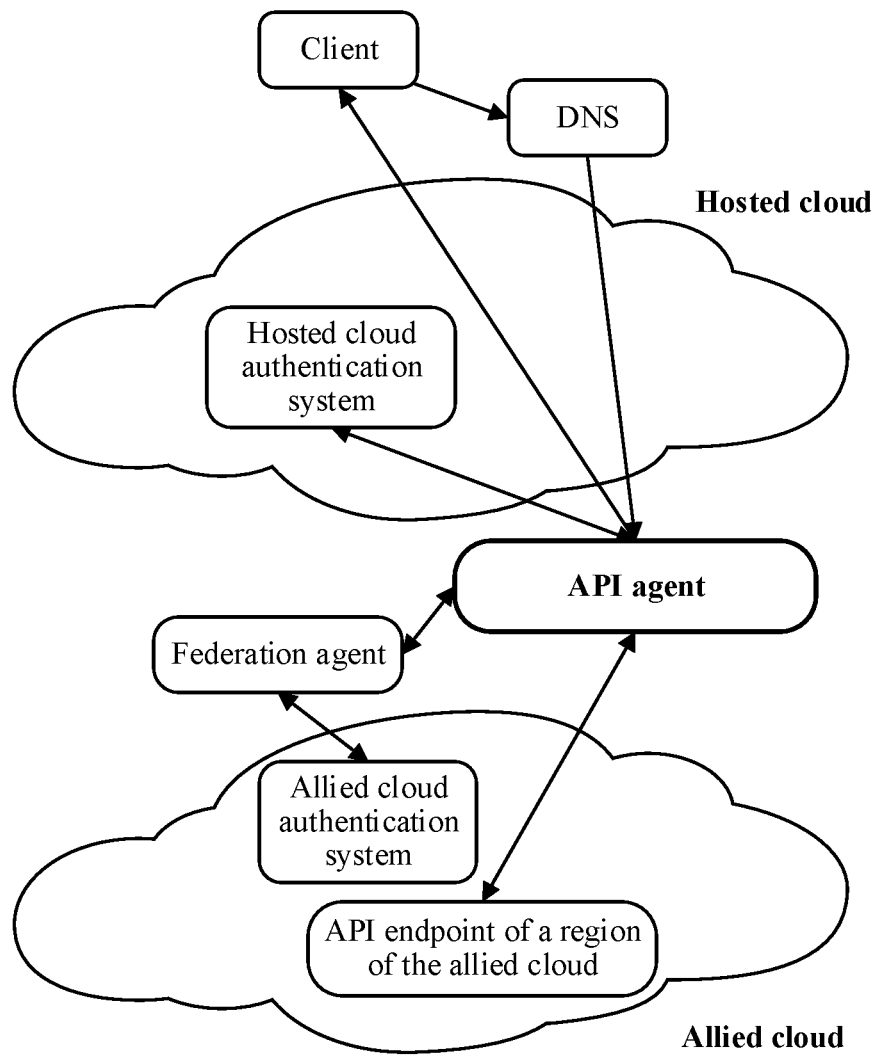
FIG. 9 is a schematic diagram of application of an API agent in a cloud federation according to an embodiment of this application.

FIG. 9 is a schematic diagram of application of an API agent in a cloud federation. The API agent interacts with a client, a federation agent, and a cloud service API endpoint of a region of an allied cloud, to process a cloud service of the region of the allied cloud for a user. The API agent obtains an API endpoint domain name of the region of the allied cloud in advance. When the user sends a cloud service API request to an API endpoint domain name of a virtual region of the hosted cloud, the API agent receives the cloud service API request, and the API agent further performs domain name replacement for the cloud service API, and forwards a cloud service API request obtained after the replacement to the API endpoint domain name of the region of the allied cloud, to obtain a cloud service API response of the region of the allied cloud. Based on different carried authentication information, there may be various manners in which the user processes a cloud service of the region of the allied cloud by using an API request, and these manners include the following.

1. Access an allied cloud API by using an account name and a password in the hosted cloud. To be specific, the user enters the account name and the password, and sends an authentication request a to an authentication API endpoint domain name of the virtual region by using the client, to obtain a second authentication token provided by the allied cloud. The user further creates a cloud service API request a carrying the second authentication token, and sends the cloud service API request a carrying the second authentication token to a cloud service API endpoint domain name of the virtual region by using the client, to obtain a cloud service API response a of the region of the allied cloud.

2. Access an allied cloud API by using an AK/SK. To be specific, the user creates a cloud service API request by entering an AK/SK and a request parameter onto a client. The client signs the cloud service API request by using a signature algorithm, where the signature algorithm is used to encrypt the request parameter and the SK to generate the signature, and add the signature and the AK to the cloud service API request as a parameter, to obtain a cloud service API request a. The client sends the cloud service API request a to a cloud service API endpoint domain name of the virtual region, to obtain a cloud service API response a of the region of the allied cloud.

Details are as follows.

Figure 10A:
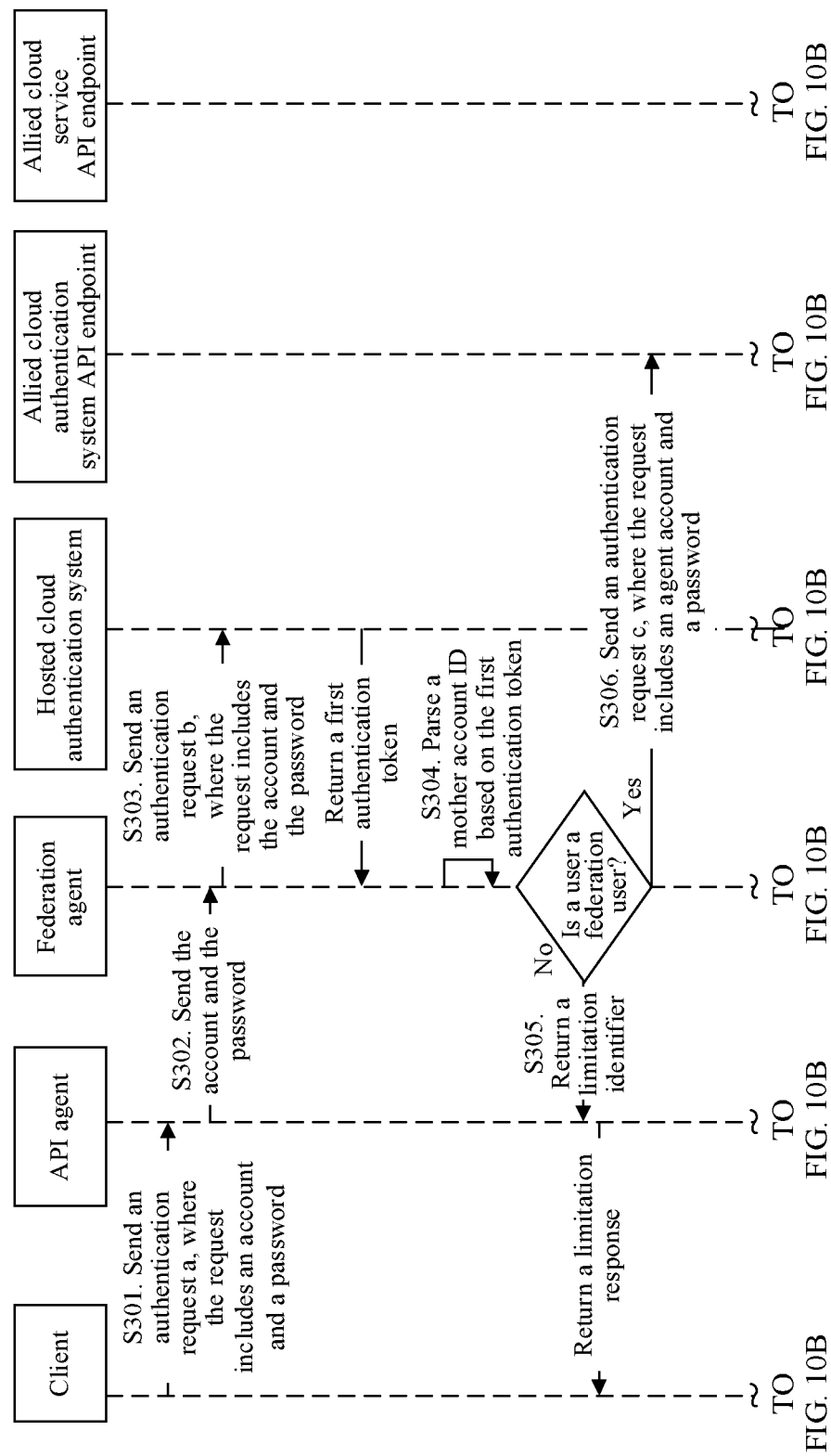
FIG. 10A and FIG. 10B are a schematic flowchart of accessing an API of an allied cloud by a user by using an account and a password according to an embodiment of this application.
Figure 10B:
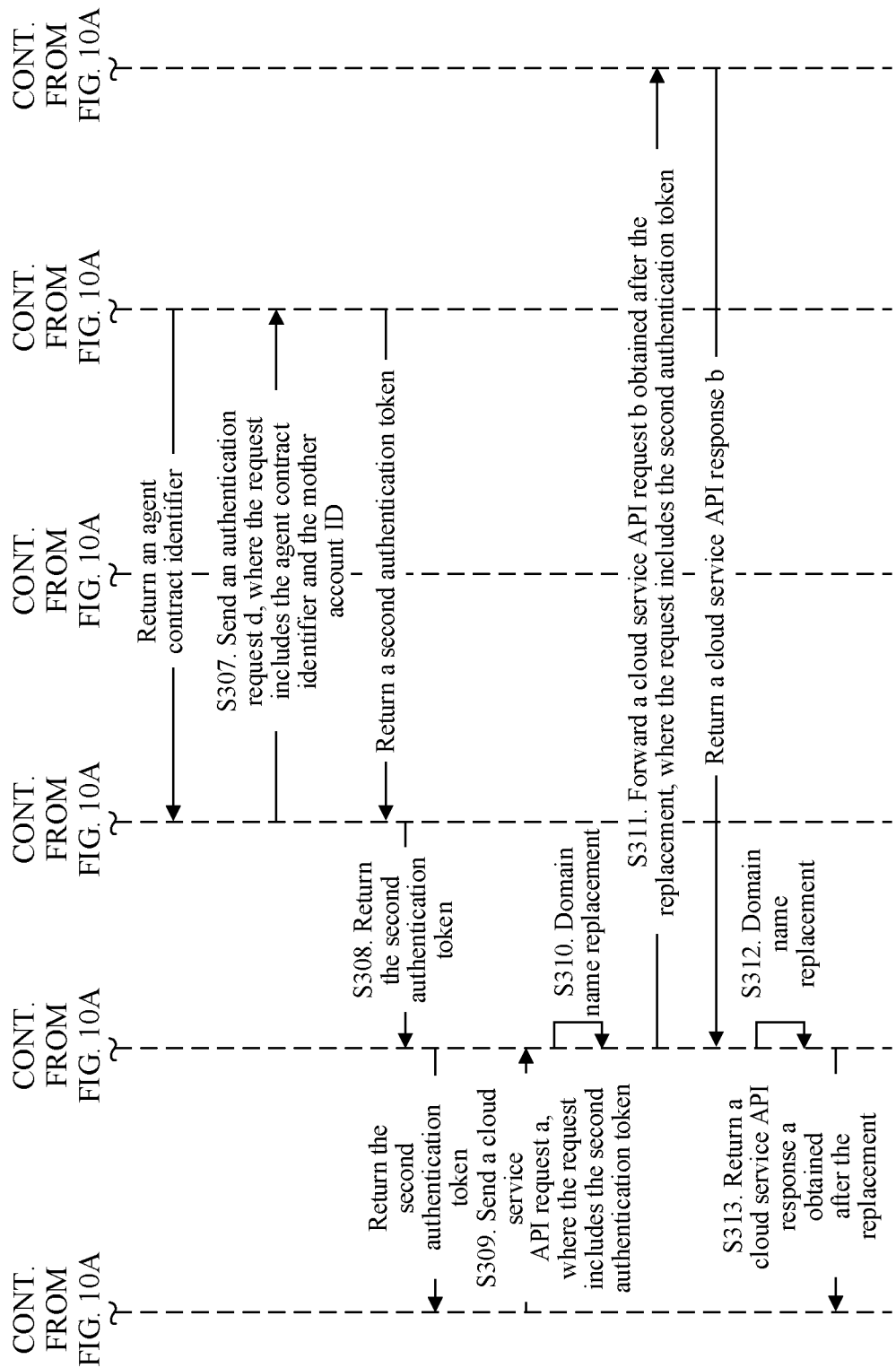

1. A detailed description of accessing the allied cloud API by using the account name and the password in the hosted cloud is provided below with reference to FIG. 10A and FIG. 10B.

S301. The user creates an authentication request a, and the client sends the authentication request a to the authentication API endpoint domain name of the virtual region of the hosted cloud. The authentication request a includes authentication information of the user, the authentication information includes an account number and a password of the user, the authentication request a is used to request the allied cloud to provide the second authentication token, and the second authentication token is a permission credential used to process the cloud service of the region of the allied cloud.

S302. The API agent receives the authentication request a, sends the authentication information (including the account number and the password) in the authentication request a to the federation agent.

S303. The federation agent receives the authentication information, sends an authentication request b to a hosted cloud authentication system based on the authentication information, where the authentication request b includes the authentication information of the user, the authentication information includes the account number and the password of the user, and the authentication request b is used to request the hosted cloud to provide a first authentication token. The hosted cloud authentication system authenticates the user based on the authentication information included in the authentication request b, and sends the first authentication token to the federation agent, where the first authentication token is a permission credential used to process a cloud service of a region of the hosted cloud, and the first authentication token includes a mother account identifier corresponding to the account number of the user.

S304. The federation agent parses, based on the first authentication token provided by the hosted cloud authentication system, the mother account identifier corresponding to the account number of the user, and the federation agent further determines, based on the mother account identifier, whether the user is a cloud federation user. If the user is not a cloud federation user, step S305 is performed, or if the user is a cloud federation user, step S306 is performed.

S305. The federation agent returns a limitation identifier to the API agent, where the limitation identifier indicates that the user has no permission to obtain the second authentication token provided by the allied cloud. The API agent returns a limitation response to the client of the user based on the limitation identifier. The user fails to obtain the second authentication token, and therefore the following steps are not performed.

S306. The federation agent sends an authentication request c to an API endpoint of an allied cloud authentication system, where the authentication request c includes an account number and a password of an agent account, and the account number and the password of the agent account are pre-stored by the federation agent when the cloud federation is built. The federation agent logs in to the agent account in the allied cloud based on the account number and the password of the agent account, and obtains an agent contract identifier from the API endpoint of the allied cloud authentication system, where the agent contract identifier is used to indicate a federation relationship between the hosted cloud and the allied cloud.

S307. The federation agent creates an authentication request d based on the mother account identifier parsed out from the first authentication token in step S304 and the agent contract identifier, and sends the authentication request d to the API endpoint of the allied cloud authentication system, where the authentication request d includes the agent contract identifier and the mother account identifier. The allied cloud authentication system authenticates a shadow account corresponding to the account number, and provides the second authentication token.

S308. The federation agent returns, to the API agent, the second authentication token provided by the allied cloud, and the API agent further returns the second authentication token to the client of the user as a response to the authentication request a.

S309. The user creates the cloud service API request a, where the cloud service API request a includes the second authentication token, the cloud service API request a is used to request to process the cloud service in the allied cloud, the cloud service API request includes a target API endpoint domain name, and the target API endpoint domain name is the cloud service API endpoint domain name of the virtual region of the hosted cloud. The client of the user sends the cloud service API request a to the API agent based on the target API endpoint domain name.

S310. The API agent receives the cloud service API request a, and replaces the target API endpoint domain name in the cloud service API request a from the cloud service API endpoint domain name of the virtual region with a cloud service API endpoint domain name of the region of the allied cloud, to form a cloud service API request b obtained after the replacement, where the cloud service API request b and the cloud service API request a include same request parameters, and the same request parameters each are used to request to process the cloud service in the allied cloud.

S311. The API agent sends the cloud service API request b to the cloud service API endpoint domain name of the region of the allied cloud based on the target API endpoint domain name, and the cloud service API endpoint of the region of the allied cloud returns a cloud service API response b to the API agent.

S312. The API agent receives the cloud service API response b returned by the allied cloud, and detects, in the cloud service API response b, a link including the API endpoint domain name of the region of the allied cloud. The API agent replaces the API endpoint domain name of the region of the allied cloud in the cloud service API response b with the API endpoint domain name of the virtual region of the hosted cloud.

S313. The API agent returns the cloud service API response a obtained after the replacement to the client of the user as a response corresponding to the cloud service API request a.

Optionally, in step S312, if the API agent receives the cloud service API response b returned by the allied cloud, and cannot detect, in the cloud service API response b, a link including the API endpoint domain name of the region of the allied cloud, the operation of domain name replacement is not performed in step S312, and Step S313 is directly performed. The API agent returns the cloud service API response b to the client of the user as a response corresponding to the cloud service API request a.

Figure 11A:
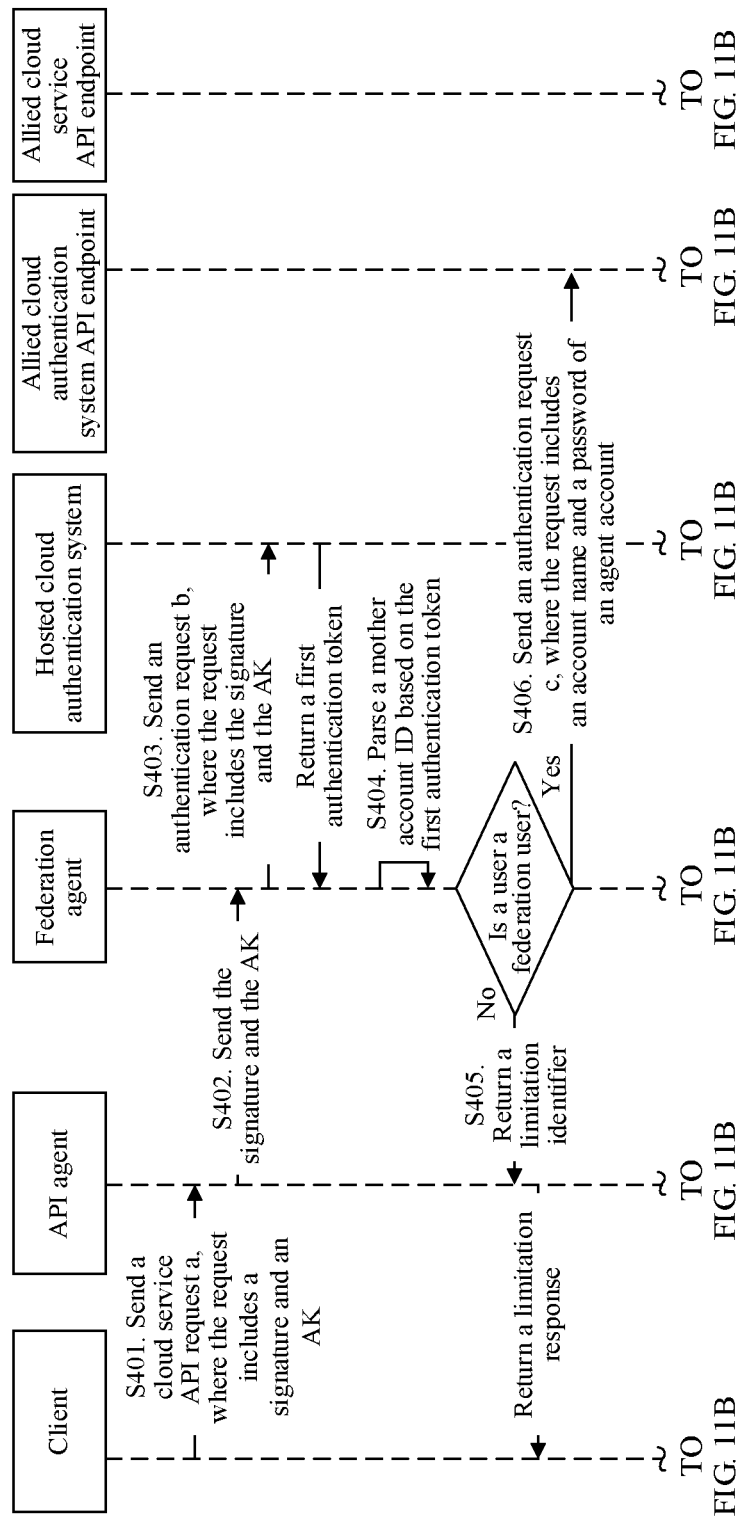
FIG. 11A and FIG. 11B are a schematic flowchart of accessing an API of an allied cloud by a user by using an AK/SK according to an embodiment of this application.
Figure 11B:
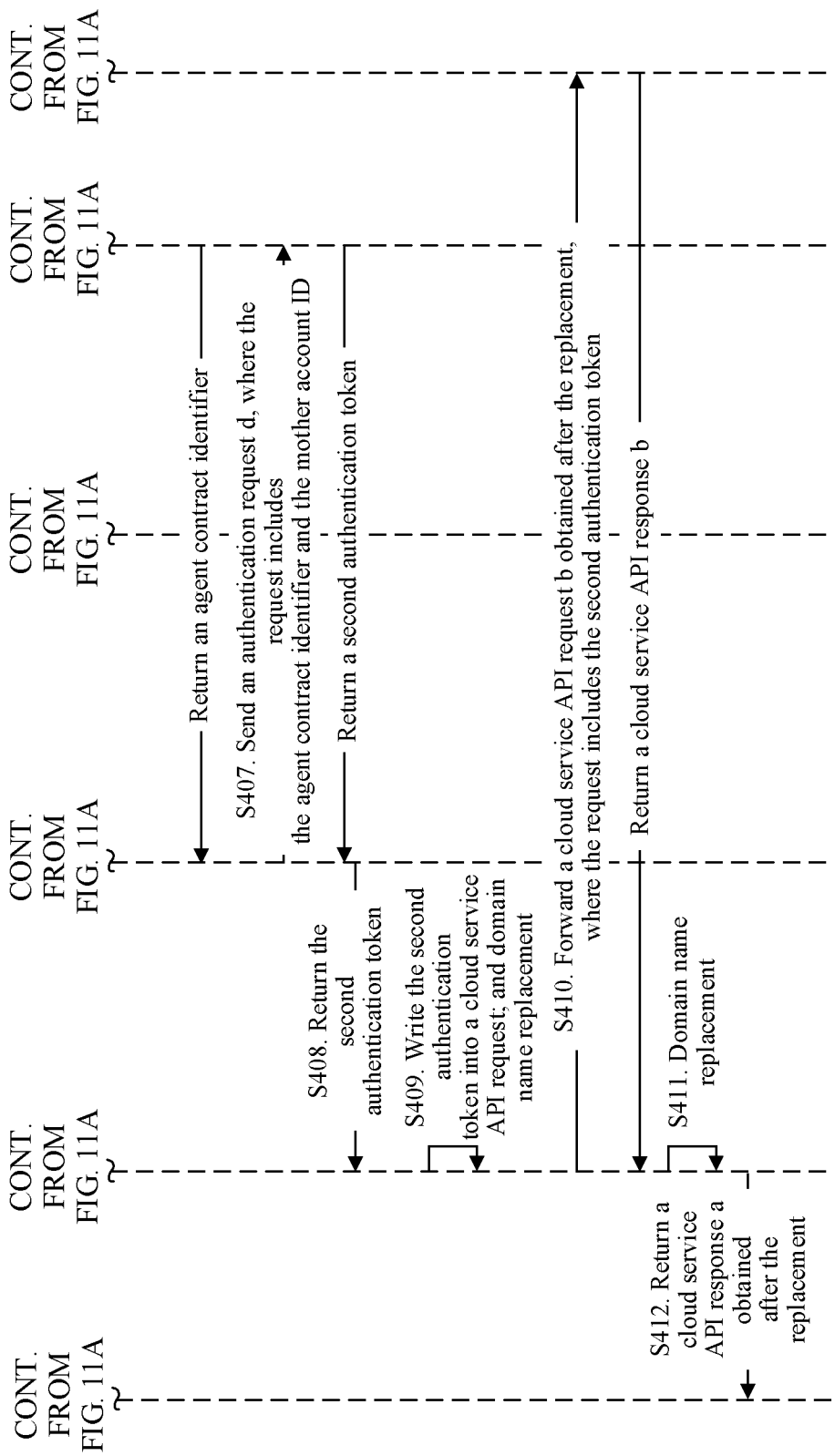

2. A detailed description of accessing the allied cloud API by using the AK/SK is provided below with reference to FIG. 11A and FIG. 11B.

The AK/SK provided by the hosted cloud is a group of key information that is generated by the hosted cloud based on the account number and the password of the user and that is used by the user to access a cloud service of the hosted cloud.

S401. The user creates a cloud service API request at the client, where the request includes the AK/SK, and the client encrypts the cloud service API request with a signature by using a signcryption algorithm. Specifically, a signature module of the client extracts the request parameter and the SK from the cloud service API request to generate a character string, encrypts the character string by using the signcryption algorithm to obtain a signature, and uses the signature and the AK as authentication information to be added to the cloud service API request, to obtain the cloud service API request a. The cloud service API request a is used to request to process the cloud service in the allied cloud, the cloud service API request includes a target API endpoint domain name, and the target API endpoint domain name is the cloud service API endpoint domain name of the virtual region of the hosted cloud. The client of the user sends the cloud service API request a to the API agent based on the target API endpoint domain name.

S402. The API agent receives the cloud service API request a, and sends the authentication information (the signature and the AK) in the cloud service API request a to the federation agent.

S403. The federation agent receives the authentication information, and sends an authentication request b to a hosted cloud authentication system based on the authentication information, where the authentication request b includes the authentication information of the user, the authentication information includes the signature and the AK, and the authentication request b is used to request the hosted cloud to provide a first authentication token. The hosted cloud authentication system authenticates the user based on the authentication information included in the authentication request b, and sends the first authentication token to the federation agent, where the first authentication token is a permission credential used to process a cloud service of a region of the hosted cloud, and the first authentication token includes a mother account identifier corresponding to an account number of the user.

Specifically, that the hosted cloud authentication system authenticates the user based on the authentication information included in the authentication request b includes that the hosted cloud authentication system decrypts the authentication information by using a signature algorithm that is the same as or corresponding to a de-signcryption algorithm of the client. The hosted cloud authentication system can recognize an identity of a visitor based on the AK in the authentication information, and can determine legality of the authentication request b based on a decrypted SK. After the authentication is completed, the hosted cloud authentication system returns a first authentication token to the federation agent.

S404. The federation agent parses the mother account identifier corresponding to the account number of the user based on the first authentication token provided by the hosted cloud authentication system, and the federation agent further determines, based on the mother account identifier, whether the user is a cloud federation user. If the user is not a cloud federation user, step S405 is performed, or if the user is a cloud federation user, step S406 is performed.

S405. The federation agent returns a limitation identifier to the API agent, where the limitation identifier indicates that the user has no permission to obtain a second authentication token provided by the allied cloud, and the API agent returns a limitation response to the client of the user based on the limitation identifier. The user fails to obtain the second authentication token, and therefore the following steps are not performed.

S406. The federation agent sends an authentication request c to an API endpoint of an allied cloud authentication system, where the authentication request c includes an account number and a password of an agent account, and the account number and the password of the agent account are pre-stored by the federation agent when the cloud federation is built. The federation agent logs in to the agent account in the allied cloud based on the account number and the password of the agent account, and obtains an agent contract identifier from the API endpoint of the allied cloud authentication system, where the agent contract identifier is used to indicate a federation relationship between the hosted cloud and the allied cloud.

S407. The federation agent creates an authentication request d based on the mother account ID parsed out from the first authentication token in step S404 and the agent contract identifier, and sends the authentication request d to the API endpoint of the allied cloud authentication system, where the authentication request d includes the agent contract identifier and the mother account identifier. The allied cloud authentication system authenticates a shadow account corresponding to the account number, and provides the second authentication token.

S408. The federation agent returns, to the API agent, the second authentication token provided by the allied cloud.

S409. The API agent receives the second authentication token sent by the federation agent, writes the second authentication token into the cloud service API request a as a parameter, and the API agent further replaces the target API endpoint domain name in the cloud service API request a including the second authentication token from the cloud service API endpoint domain name of the virtual region with a cloud service API endpoint domain name of the region of the allied cloud, to form a cloud service API request b obtained after the replacement, where the cloud service API request b and the cloud service API request a including the second authentication token include same request parameters, and the request parameters each are used to request to process the cloud service in the allied cloud.

S410. The API agent sends the cloud service API request b to the cloud service API endpoint domain name of the region of the allied cloud based on the target API endpoint domain name, and the cloud service API endpoint of the region of the allied cloud returns a cloud service API response b to the API agent.

S411. The API agent receives the cloud service API response b returned by the allied cloud, detects, in the cloud service API response b, a link including the API endpoint domain name of the region of the allied cloud. The API agent replaces the API endpoint domain name of the region of the allied cloud in the cloud service API response b with the API endpoint domain name of the virtual region of the hosted cloud.

S412. Return a cloud service API response a obtained after the replacement to the client of the user as a response corresponding to the cloud service API request a.

Optionally, in step S411, if the API agent receives the cloud service API response b returned by the allied cloud, and cannot detect, in the cloud service API response b, a link including the API endpoint domain name of the region of the allied cloud, the operation of domain name replacement is not performed in step S411, and step S412 is directly performed. The API agent returns the cloud service API response b to the client of the user as a response corresponding to the cloud service API request a.

The hosted cloud performs unified charging on a cloud service service detail record of the user in the allied cloud.

In the cloud federation, the user and a subuser of the user only need to use an account in the hosted cloud to process a cloud service of a region of the hosted cloud and a cloud service of at least one region of the allied cloud. A service detail record agent forwards, to the hosted cloud, cloud service service detail records of a mother account of the user and an account under the mother account in different regions of different clouds in the cloud federation, and the hosted cloud performs unified settlement with the user. A cloud service service detail record of each user in the region of the allied cloud includes a usage parameter of a cloud service used by the user in the region of the allied cloud, where the usage parameter may be usage duration, a capacity, and traffic.

Figure 12:
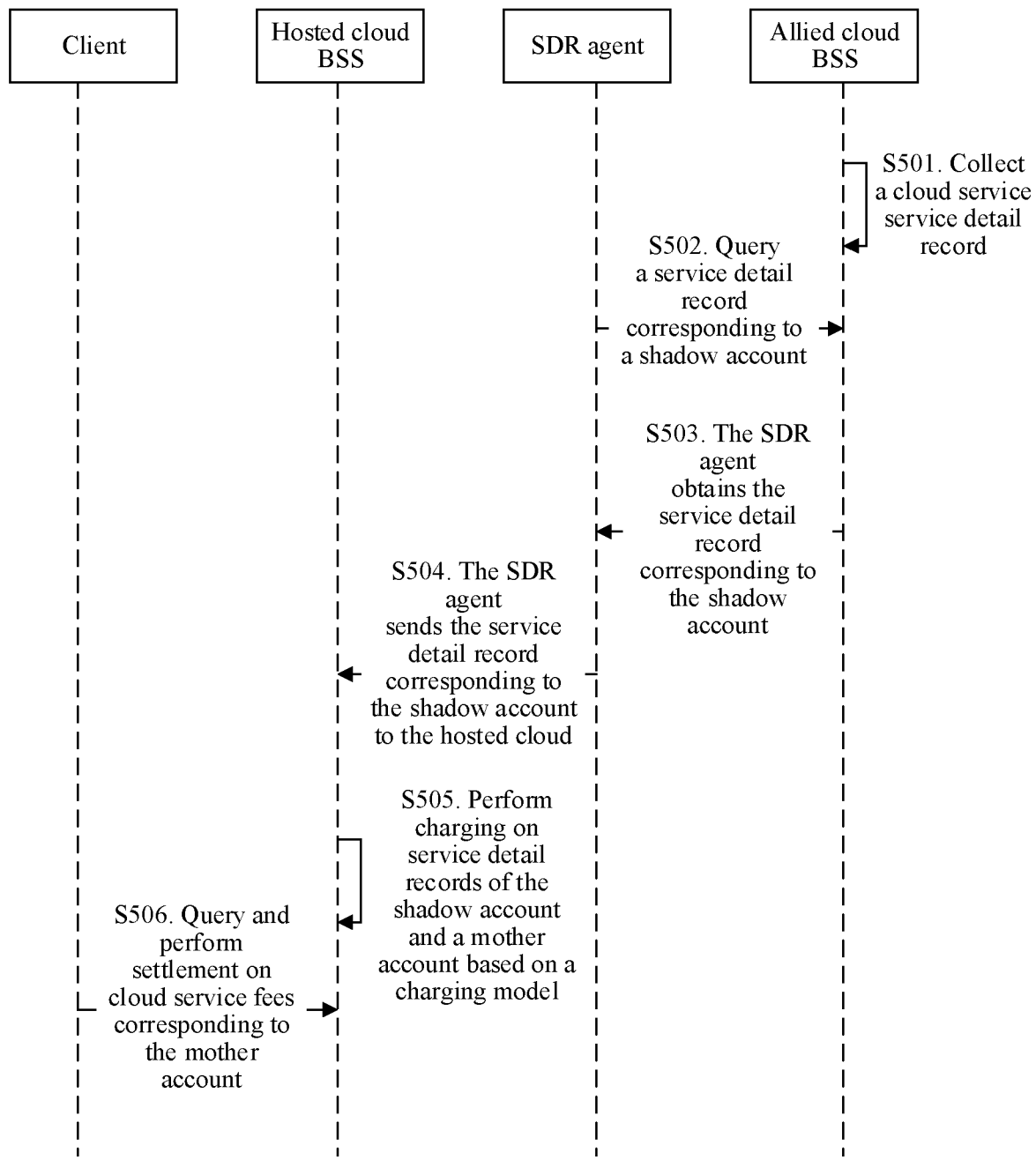
FIG. 12 is a schematic flowchart of performing unified charging by a hosted cloud on a cloud service service detail record of a user in an allied cloud according to an embodiment of this application.

The following describes a procedure in which a hosted cloud performs unified charging on a cloud service service detail record of a user in an allied cloud with reference to FIG. 12.

S501. An allied cloud BSS collects cloud service service detail records in the allied cloud, and stores the cloud service service detail records in a service detail record server of the allied cloud BSS, where the cloud service service detail records include a cloud service service detail record of a shadow account registered by the hosted cloud with the allied cloud and a cloud service service detail record of an account registered by the user of the allied cloud with the allied cloud.

S502. A service detail record agent queries, in an allied cloud authentication system, a hosted cloud identifier corresponding to the shadow account, and writes the hosted cloud identifier into the cloud service service detail record of the corresponding shadow account.

S503. The service detail record agent synchronizes the service detail record of the shadow account in the allied cloud BSS to a service detail record storage unit of the service detail record agent.

S504. The service detail record agent forwards the service detail record of the shadow account to a hosted cloud BSS, and the hosted cloud BSS performs, based on a mother account identifier carried in the shadow account, unified management on the service detail record of the shadow account and a cloud service service detail record of a mother account corresponding to the shadow account in the hosted cloud.

S505. The hosted cloud performs unified charging on the service detail records of the mother account of the user and the corresponding shadow account based on a service detail record model and a charging model of the hosted cloud, to generate a bill of the mother account.

S506. The user logs in by using the mother account name and a password, to access the hosted cloud BSS, and queries information about service detail records and fees of the mother account in a region and a virtual region of the hosted cloud, and the user performs settlement with the hosted cloud on fees of the mother account.

The foregoing steps S501 to S505 are performed regularly, and the user may perform step S506 at any time. A service detail record and a bill that are queried by the user in the hosted cloud is information generated in steps S501 to S505 at a fixed time before the query.

Optionally, the user may alternatively perform the foregoing step S506 by logging in by using an account name and a password, and perform settlement with the hosted cloud on a bill of the mother account to which the account of the user belongs.

When the mother account registered by the user with the hosted cloud has an insufficient balance or malice arrearage, the hosted cloud BSS stops providing a cloud service of a region of the hosted cloud (including stopping providing a cloud service that is being used by the mother account and the account under the mother account and no longer accepting a request of the mother account and the account under the mother account for the cloud service of the region of the hosted cloud) for the mother account and an account under the mother account, and the hosted cloud BSS further sends a service stop request to the service detail record agent, where the service stop request is used to freeze permission of the shadow account, corresponding to the mother account in the hosted cloud, in the allied cloud to use a cloud service of the allied cloud. The service detail record agent forwards the service stop request to the allied cloud BSS, and the allied cloud also stops providing a cloud service of an allied cloud region (including stopping providing a cloud service that is being used by the shadow account and no longer accepting a request of the shadow account for the cloud service of the region of the allied cloud) for the shadow account.

Figure 13:
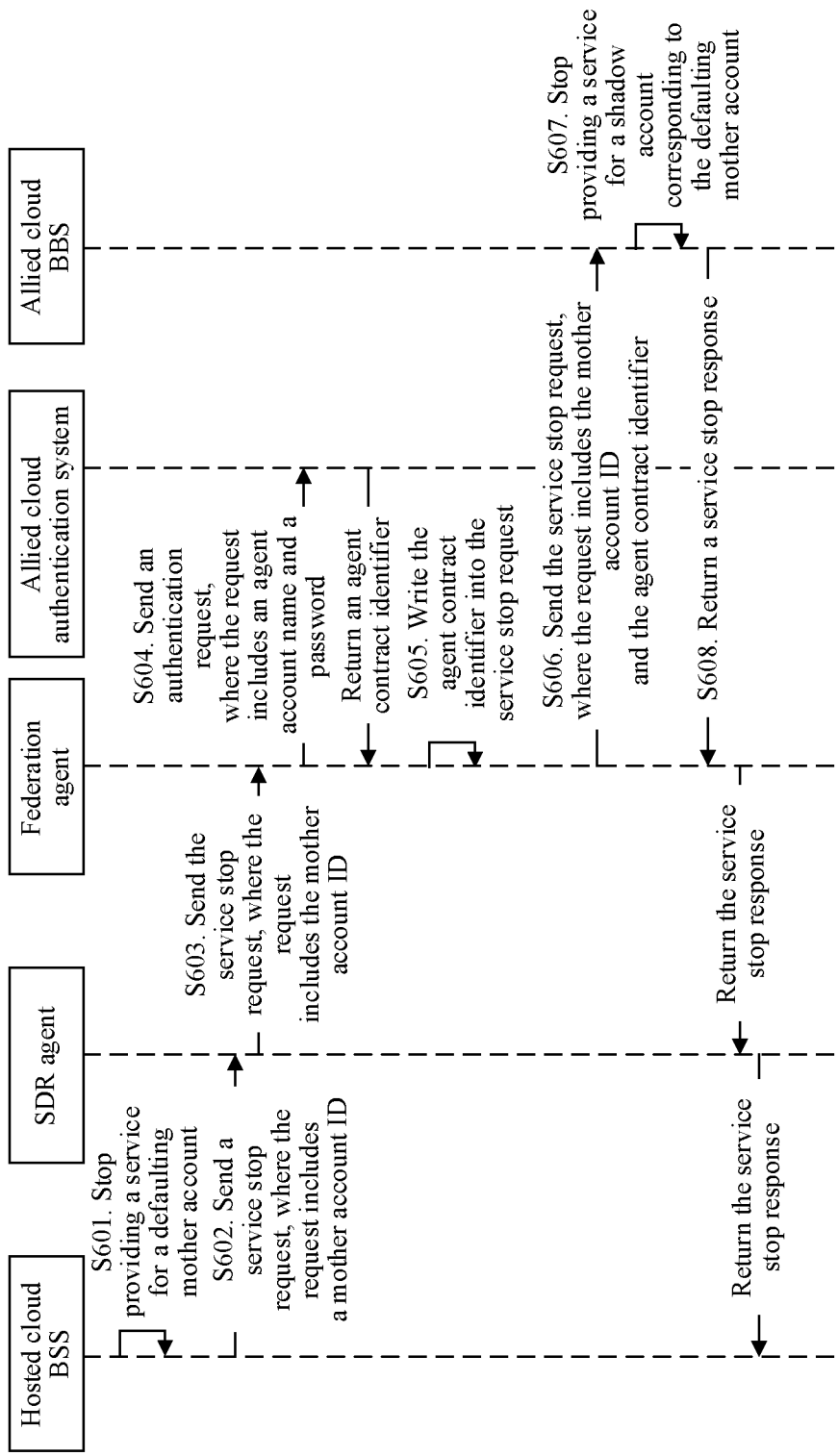
FIG. 13 is a schematic flowchart of stopping providing a service in a hosted cloud and an allied cloud according to an embodiment of this application.

The following describes a procedure in which a hosted cloud stops providing a service for a defaulting user in the hosted cloud and an allied cloud with reference to FIG. 13.

S601. A hosted cloud BSS determines that a mother account of a user has an insufficient balance (or has an arrearage), and the hosted cloud BSS limits permission of the mother account and an account under the mother account to use a cloud service of a region of the hosted cloud, and rejects a request of the mother account and the account under the mother account for the cloud service of the region of the hosted cloud.

S602. The hosted cloud BSS sends a service stop request to a service detail record agent, where the service stop request is used to freeze permission of a shadow account, corresponding to the mother account in the hosted cloud, in the allied cloud to use a cloud service of the allied cloud, and the service stop request includes a mother account identifier.

S603. The service detail record agent receives the service stop request sent by the hosted cloud BSS, and the service detail record agent sends the service stop request to a federation agent.

S604. The federation agent sends an authentication request to an allied cloud authentication system by using an account name and a password of an agent account, where the authentication request includes the account name and the password of the agent account. The allied cloud authentication system returns an agent contract identifier of the agent account in the allied cloud to the federation agent.

S605. The federation agent writes the agent contract identifier into the service stop request as a parameter.

S606. The federation agent sends the service stop request including the agent contract identifier and the mother account ID to the allied cloud.

S607. The allied cloud searches, based on the agent contract identifier and the mother account ID in the service stop request, for the shadow account corresponding to the mother account, and an allied cloud BSS limits permission of the shadow account to use a cloud service of a region of the allied cloud, and rejects a further request of the shadow account for the cloud service of the region of the allied cloud.

S608. The allied cloud returns a service stop response to the federation agent, the federation agent further returns the response to the service detail record agent, and the service detail record agent returns the response to the hosted cloud.

The foregoing steps S601 to S608 are performed, so that permission of both the mother account that has an arrearage or insufficient balance in the hosted cloud and the shadow account, corresponding to the mother account, in the allied cloud to use the cloud service in the hosted cloud and the allied cloud is frozen.

A hosted cloud OSS performs unified processing on operation and maintenance information of the shadow account in the allied cloud.

An OSS agent interacts with an allied cloud OSS, and obtains operation and maintenance information corresponding to the shadow account (for example, an email sent by the allied cloud to the shadow account and an operation and maintenance worksheet created by the user for a cloud service of a virtual region), the OSS agent forwards the operation and maintenance information to the hosted cloud OSS, and the hosted cloud OSS performs unified processing on the operation and maintenance information.

Apparatus

Figure 14:
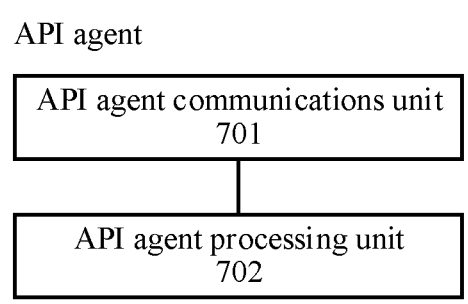
FIG. 14 is a schematic structural diagram of an alliance management apparatus 700 according to an embodiment of this application.

This application provides an alliance management apparatus 700, where the apparatus includes an API agent, and the API agent is configured to perform the operations performed by the API agent in the foregoing steps S301 to S312 and steps S401 to S411. The apparatus may be deployed in a hosted cloud, an allied cloud, or a third-party data center, and various parts of the apparatus may be separately deployed in the three environments the hosted cloud, the allied cloud, or the third-party data center, or may be deployed in any two of the three environments. A division manner of functional units in the apparatus is not limited in this application. The following provides, by using an example, a division manner of the functional units. As shown in FIG. 14, the API agent included in the alliance management apparatus 700 includes an API agent communications unit 701, configured to perform the operations performed by the API agent in the foregoing steps S309 and S311, or configured to perform the operations performed by the API agent in the foregoing steps S401 and S410, and an API agent processing unit 702, configured to perform the operation in the foregoing step S310, or configured to perform the operation in the foregoing step S409.

Optionally, the API agent communications unit 701 is further configured to perform the operations performed by the API agent in the foregoing steps S301, S302, S305, S308, and S313.

Optionally, the API agent communications unit 701 is further configured to perform the operations performed by the API agent in the foregoing steps S402, S405, S408, and S412.

Optionally, the API agent processing unit 702 is further configured to perform the operation in the foregoing step S312.

Optionally, the API agent processing unit 702 is further configured to perform the operation in the foregoing step S411.

A cloud system in which the alliance management apparatus 700 is located further includes a hosted cloud and an allied cloud, where the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped to the second region in the hosted cloud.

The foregoing units may be software units or hardware units, or some of the foregoing units are software units, and some of the foregoing units are hardware units. A connection is established between the foregoing units by using a communications channel.

Figure 15:
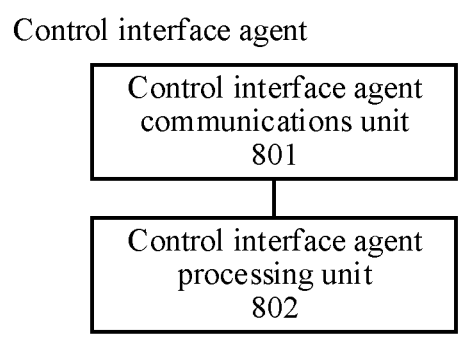
FIG. 15 is a schematic structural diagram of an alliance management apparatus 800 according to an embodiment of this application.

This application provides an alliance management apparatus 800, where the apparatus includes a control interface agent, and the control interface agent is configured to perform the operations performed by the control interface agent in the foregoing steps S201 to S214. The apparatus may be deployed in a hosted cloud, an allied cloud, or a third-party data center, or various parts of the apparatus may be separately deployed in the three environments the hosted cloud, the allied cloud, or the third-party data center, or may be deployed in any two of the three environments. A division manner of functional units in the apparatus is not limited in this application. The following provides, by using an example, a division manner of the functional units. As shown in FIG. 15, the control interface agent included in the alliance management apparatus 800 includes a control interface agent communications unit 801, configured to perform the operations performed by the control interface agent in the foregoing steps S210 and S214, and a control interface agent processing unit 802, configured to perform the operations performed by the control interface agent in the foregoing steps S211 to S213.

Optionally, the control interface agent communications unit 801 is further configured to perform the operations performed by the control interface agent in the foregoing steps S201, S202, and S207.

Optionally, the control interface agent processing unit 802 is further configured to perform the operation in the foregoing step S209.

A cloud system in which the alliance management apparatus 800 is located further includes a hosted cloud and an allied cloud, where the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped to the second region in the hosted cloud. The foregoing units may be software units or hardware units, or some of the foregoing units are software units, and some of the foregoing units are hardware units. A connection is established between the foregoing units by using a communications channel.

Figure 16:
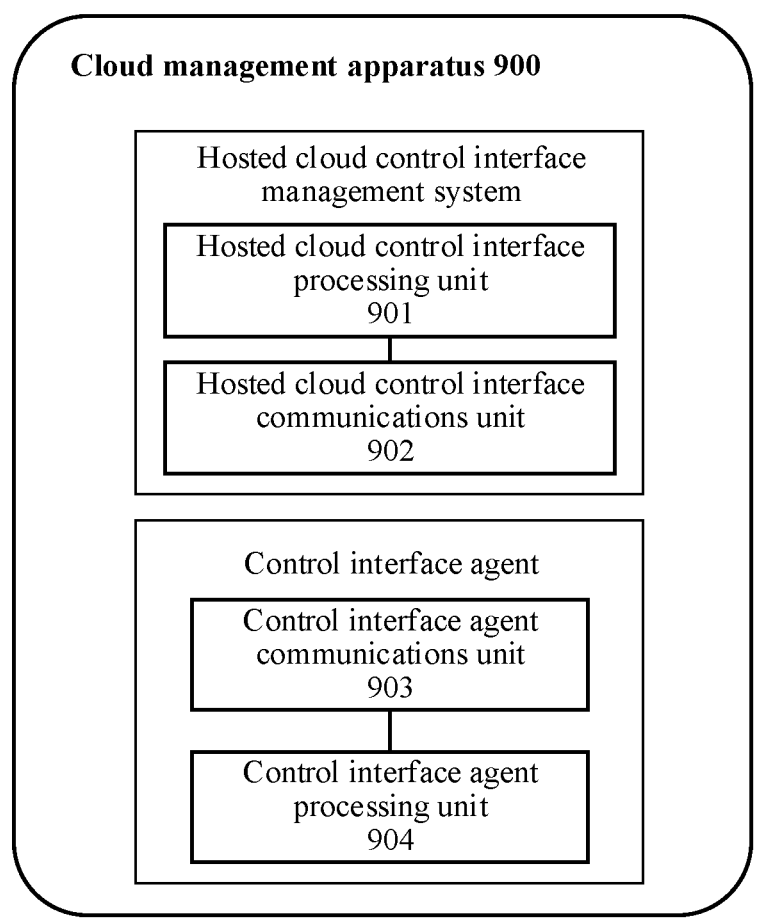
FIG. 16 is a schematic structural diagram of a cloud management apparatus 900 according to an embodiment of this application.

This application provides a cloud management apparatus 900, where the apparatus may include a hosted cloud control interface management system and a control interface agent in the cloud federation of this application. A division manner of functional units in the apparatus is not limited in this application. The following provides, by using an example, a division manner of the functional units. As shown in FIG. 16, the hosted cloud control interface management system included in the cloud management apparatus 900 further includes a hosted cloud control interface processing unit 901 and a hosted cloud control interface communications unit 902. The control interface agent included in the cloud management apparatus 900 further includes a control interface agent communications unit 903 and a control interface agent processing unit 904.

The hosted cloud control interface processing unit 901 is configured to provide a management interface of the hosted cloud, where the management interface of the hosted cloud includes a region selection subinterface, and the region selection subinterface includes an element of the first region and an element of the virtual region.

The hosted cloud control interface communications unit 902 is configured to receive a first control interface request sent by a client of a user, where the first control interface request is generated when the user selects the element of the first region.

The hosted cloud control interface processing unit 901 is further configured to provide a control interface of the first region for the client based on the first control interface request, where the control interface of the first region presents information about a cloud service of the first region.

The control interface agent communications unit 903 is configured to receive a second control interface request sent by the client, where the control interface request is generated when the user selects the element of the virtual region.

The control interface agent processing unit 904 is configured to provide a control interface of the virtual region for the client based on the second control interface request, where the control interface of the virtual region presents information about a cloud service of the second region.

The hosted cloud includes the first region, the allied cloud includes the second region, the first region includes some hardware resources and some software resources of the hosted cloud, the second region includes some hardware resources and some software resources of the allied cloud, the hosted cloud further provides the virtual region for the user, and the virtual region is mapped by the second region in the hosted cloud.

The foregoing units may be software units or hardware units, or some of the foregoing units are software units, and some of the foregoing units are hardware units. A connection is established between the foregoing units by using a communications channel.

Figure 17:
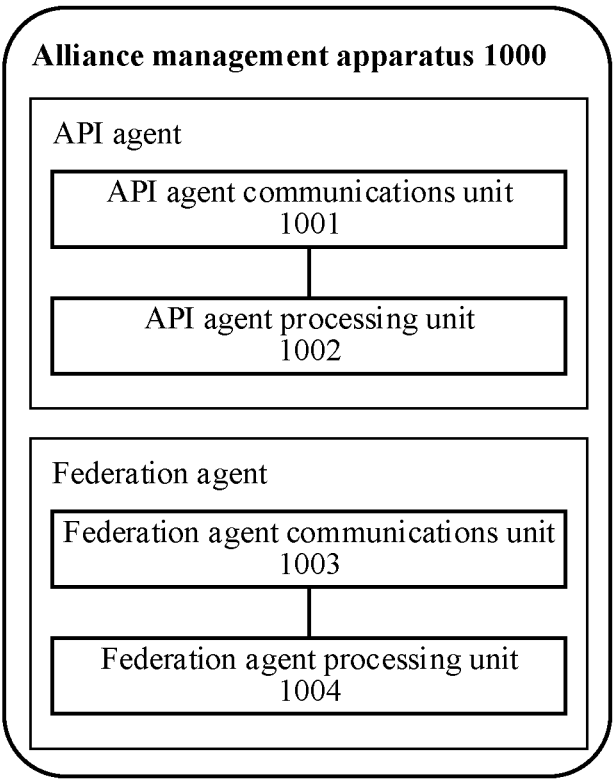
FIG. 17 is a schematic structural diagram of an alliance management apparatus 1000 according to an embodiment of this application.

This application provides an alliance management apparatus 1000, where the apparatus may include the API agent and the federation agent in this application, the apparatus may be deployed in a hosted cloud, an allied cloud, or a third-party data center, or various parts of the apparatus may be separately deployed in the three environments the hosted cloud, the allied cloud, or the third-party data center, or may be deployed in any two of the three environments. A division manner of functional units in the apparatus is not limited in this application. The following provides, by using an example, a division manner of the functional units. As shown in FIG. 17, the API agent included in the alliance management apparatus 1000 further includes an API agent communications unit 1001 and an API agent processing unit 1002. The federation agent included in the alliance management apparatus 1000 further includes a federation agent communications unit 1003 and a federation agent processing unit 1004.

The API agent communications unit 1001 is configured to perform the operations in the foregoing steps S301, S302, S305, and S308, or configured to perform the operations in the foregoing steps S401, S402, S405, and S408.

The API agent processing unit 1002 is configured to perform the operations in the foregoing steps S310 and S312, or configured to perform the operations in the foregoing steps S409 and S411.

The federation agent communications unit 1003 is configured to perform the operations in the foregoing steps S304, S306, and S307, and is further configured to perform the operations in the foregoing steps S403, S406, and S407.

The federation agent processing unit 1004 is configured to perform the operation in the foregoing step S303, or configured to perform the operation in the foregoing step S404.

A cloud system in which the alliance management apparatus 1000 is located further includes a hosted cloud and an allied cloud, where the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped by the second region in the hosted cloud. The foregoing units may be software units or hardware units, or some of the foregoing units are software units, and some of the foregoing units are hardware units. A connection is established between the foregoing units by using a communications channel.

Figure 18:
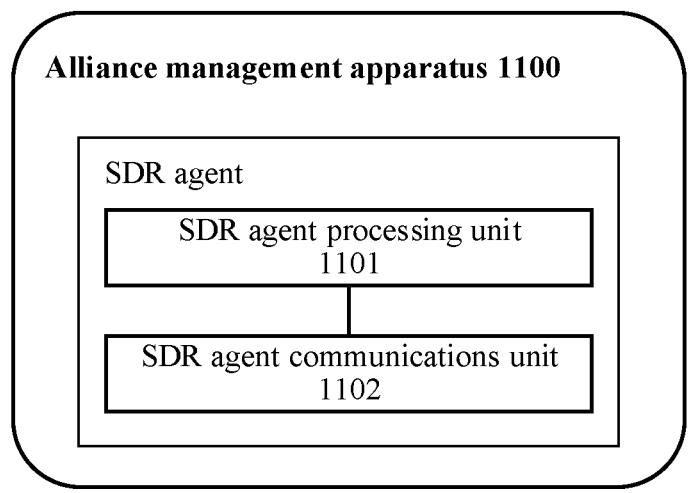
FIG. 18 is a schematic structural diagram of an alliance management apparatus 1100 according to an embodiment of this application.

This application further provides an alliance management apparatus 1100, where the apparatus includes a service detail record agent module, the apparatus may be deployed in a hosted cloud, an allied cloud, or a third-party data center, or various parts of the apparatus may be separately deployed in the three environments the hosted cloud, the allied cloud, or the third-party data center, or may be deployed in any two of the three environments. A division manner of functional units in the apparatus is not limited in this application. The following provides, by using an example, a division manner of the functional units. As shown in FIG. 18, the service detail record agent module included in the alliance management apparatus 1100 includes a service detail record agent processing unit 1101, configured to perform the operations in the foregoing steps S502 and S503, and a service detail record agent communications unit 1102, configured to perform the operation in the foregoing step S504.

Optionally, the service detail record agent communications unit is further configured to perform the operations performed by the service detail record agent in the foregoing steps S602, S603, and S608.

A cloud system in which the alliance management apparatus 1100 is located further includes a hosted cloud and an allied cloud, where the hosted cloud includes a first region, the allied cloud includes a second region, the first region includes some hardware resources and some software resources of the hosted cloud, the second region includes some hardware resources and some software resources of the allied cloud, the hosted cloud further provides a virtual region for a user, and the virtual region is mapped by the second region in the hosted cloud. The foregoing units may be software units or hardware units, or some of the foregoing units are software units, and some of the foregoing units are hardware units. A connection is established between the foregoing units by using a communications channel.

Computing Device System

The cloud federation in this application includes a hosted cloud, at least one allied cloud, and at least one alliance management apparatus. The alliance management apparatus may be deployed in the hosted cloud, the allied cloud, or a third-party data center. The alliance management apparatus may be partially separately deployed in the three environments the hosted cloud, the allied cloud, and the third-party data center, or may be deployed in any two of the three environments.

Figure 19A:
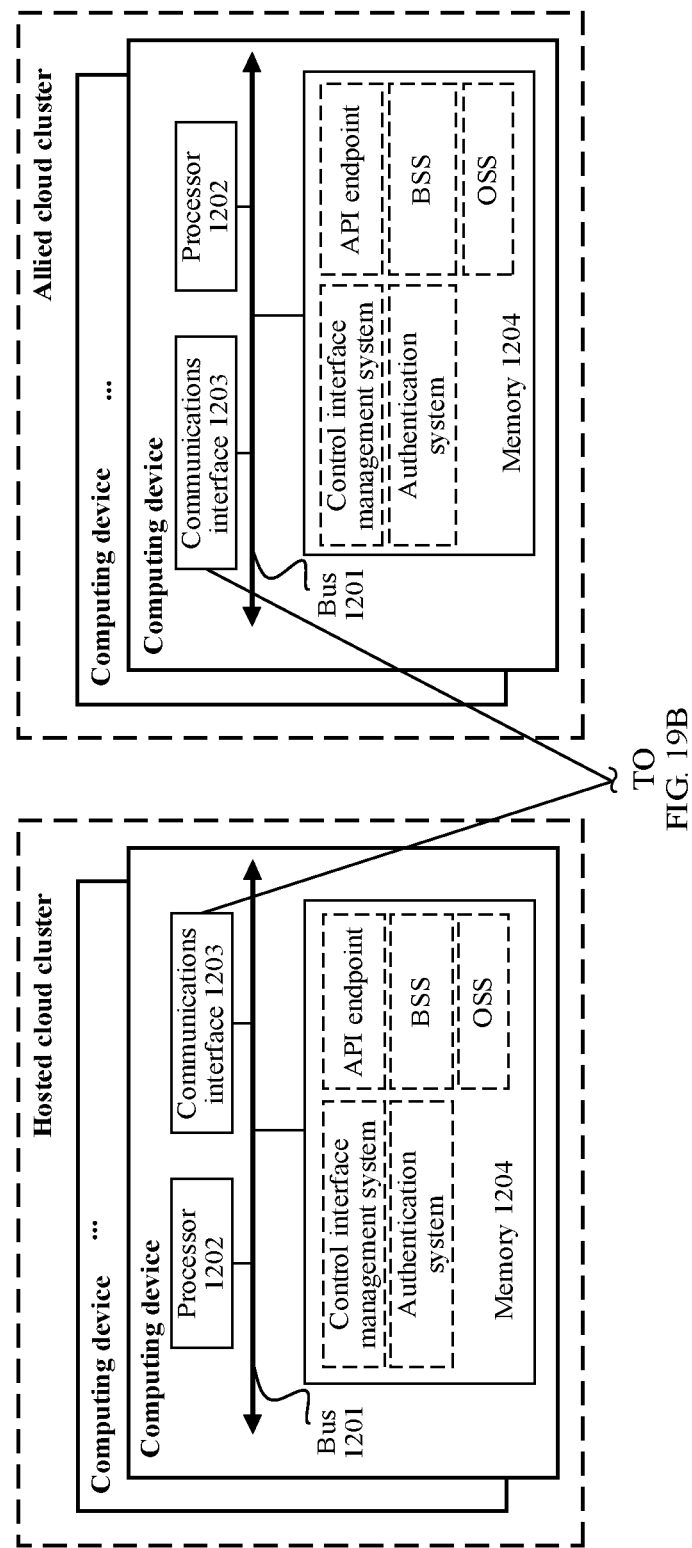
FIG. 19A and FIG. 19B are a schematic structural diagram of a computing device system 1200 according to an embodiment of this application.
Figure 19B:
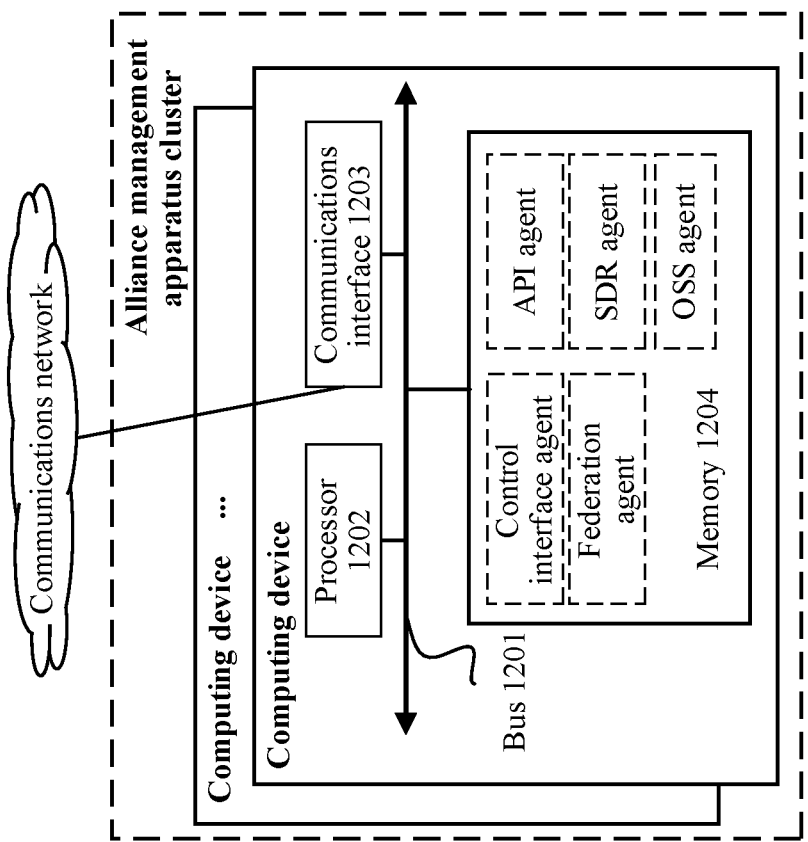

Therefore, as shown in FIG. 19A and FIG. 19B, this application provides a computing device system 1200. The computing device system includes a hosted cloud cluster, an allied cloud cluster, and an alliance management apparatus cluster. The hosted cloud cluster is configured to perform the operations performed by the hosted cloud control interface management system, the hosted cloud authentication system, the hosted cloud BSS, the hosted cloud OSS, and the hosted cloud API endpoint. The allied cloud cluster is configured to perform the operations performed by the allied cloud control interface management system, the allied cloud authentication system, the allied cloud BSS, the allied cloud OSS, and the allied cloud API endpoint. The alliance management apparatus cluster is configured to perform the operations performed by the modules such as the control interface agent, the API agent, the federation agent, the service detail record agent, and the OSS agent. Each cluster in the computing device system 1200 includes at least one computing device, the computing device includes a bus 1201, a processor 1202, a communications interface 1203, and a memory 1204. The processor 1202, the memory 1204, and the communications interface 1203 communicate with each other by using the bus 1201.

The processor 1202 may be a central processing unit (CPU). The memory may include a volatile memory, for example, a random access memory. The memory 1204 may further include a nonvolatile memory, for example, a read-only memory, a flash memory, a hard disk drive or a solid-state drive. The memory 1204 stores executable program code. The memory 1204 may further include an operating system and other software modules required for running processes. The operating system may be LINUX™, UNIX™, WINDOWS™, or the like.

The processor 1202 of the computing device in the hosted cloud cluster executes executable code, to perform all or some of the methods performed by the hosted cloud control interface management system, the hosted cloud authentication system, the hosted cloud BSS, the hosted cloud OSS, and the hosted cloud API endpoint in the foregoing embodiments. The memory 1204 of the computing device in the hosted cloud cluster stores code required for performing all or some of the methods performed by the hosted cloud control interface management system, the hosted cloud authentication system, the hosted cloud BSS, the hosted cloud OSS, and the hosted cloud API endpoint in the foregoing embodiments.

The processor 1201 of the computing device in the allied cloud cluster executes executable code, to perform all or some of the methods performed by the allied cloud control interface management system, the allied cloud authentication system, the allied cloud BSS, the allied cloud OSS, and the allied cloud API endpoint in the foregoing embodiments. The memory 1204 of the computing device in the allied cloud cluster stores code required for performing all or some of the methods performed by the allied cloud control interface management system, the allied cloud authentication system, the allied cloud BSS, the allied cloud OSS, and the allied cloud API endpoint in the foregoing embodiments.

The processor 1201 of the computing device in the alliance management apparatus cluster executes executable code, to perform all or some of the methods performed by the control interface agent, the API agent, the federation agent, the service detail record agent, and the OSS agent in the foregoing embodiments. The memory 1204 of the computing device in the allied cloud cluster stores code required for running all or some of the apparatus 700, the apparatus 800, the apparatus 900, the apparatus 1000, and the apparatus 1100, to perform all or some of the methods performed by the control interface agent, the API agent, the federation agent, the service detail record agent, and the OSS agent in the foregoing embodiments.

There may be a plurality of alliance management apparatus clusters, the plurality of alliance management apparatus clusters may completely or partially be a sub-cluster of the hosted cloud cluster, or may completely or partially be a sub-cluster of the allied cloud cluster, or may completely or partially be a single computing device cluster.

All or some of the foregoing embodiments may be implemented by software, hardware, firmware or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, wireless, or microwave) manner. The computer-readable storage medium may be any available medium accessible by a computer, or a data storage device, for example, a server or a data center, integrating one or more available mediums. The usable medium may be a magnetic medium (for example, a floppy disk, a hard disk, or a magnetic tape), an optical medium (for example, a digital versatile disc (DVD)), a semiconductor medium (for example, a solid-state drive), or the like.

The description of the procedure corresponding to each accompanying drawing has respective focuses. For a part that is not described in detail in a procedure, reference may be made to related descriptions in other procedures.

What is claimed is:

1. A method implemented by an alliance management apparatus, wherein the method comprises:
receiving a request to access a virtual region of a hosted cloud;
processing the request to produce a processed request; and
forwarding the processed request to an allied cloud having a region mapped to the virtual region,
wherein the processed request instructs the allied cloud to process a cloud service in the region.

2. The method of claim 1, wherein the request is an application programming interface (API) request from a client, and wherein the API request requests processing the cloud service in the virtual region.

3. The method of claim 2, further comprising:
receiving, based on the API request, a first API response from an API endpoint of the region, wherein the first API response comprises information about the cloud service processed in the region and a first API endpoint domain name of the region;
replacing the first API endpoint domain name with a second API endpoint domain name of the virtual region to obtain a second API response; and
returning the second API response to the client.

4. The method of claim 1, wherein the request carries a first application programming interface (API) endpoint domain name of the virtual region, and wherein processing the request comprises replacing the first API endpoint domain name with a second API endpoint domain name of the region.

5. The method of claim 4, wherein the first API endpoint domain name corresponds to an Internet Protocol (IP) address of the alliance management apparatus in a Domain Name System (DNS).

6. The method of claim 4, wherein replacing the first API endpoint domain name comprises querying, based on the first API endpoint domain name, configuration information to obtain the second API endpoint domain name, and wherein the configuration information records a correspondence between the first API endpoint domain name and the second API endpoint domain name.

7. The method of claim 4, wherein replacing the first API endpoint domain name comprises converting, based on a pre-configured domain name rule, the first API endpoint domain name into the second API endpoint domain name.

8. The method of claim 7, wherein the pre-configured domain name rule comprises a correspondence between a first cloud identifier comprised in the first API endpoint domain name and a second cloud identifier comprised in the second API endpoint domain name.

9. The method of claim 1, further comprising:
receiving, from the allied cloud, a response corresponding to the processed request; and
forwarding the response.

10. The method of claim 9, wherein the response comprises information about the cloud service processed in the region.

11. An apparatus, comprising:
a memory configured to store instructions; and
one or more processors coupled to the memory and configured to execute the instructions to cause the apparatus to:
receive a request to access a virtual region of a hosted cloud;
process the request to produce a processed request; and
forward the processed request to an allied cloud having a region mapped to the virtual region,
wherein the processed request instructs the allied cloud to process a cloud service in the region.

12. The apparatus of claim 11, wherein the request is an application programming interface (API) request from a client, and wherein the API request requests processing the cloud service in the virtual region.

13. The apparatus of claim 12, wherein the instructions further cause the apparatus to:
receive, based on the API request, a first API response from an API endpoint from the region, wherein the first API response comprises information about the cloud service processed in the region and a first API endpoint domain name of the region;
replace the first API endpoint domain name with a second API endpoint domain name of the virtual region to obtain a second API response; and
return the second API response to the client.

14. The apparatus of claim 11, wherein the request carries a first application programming interface (API) endpoint domain name of the virtual region, and wherein the instructions further cause the apparatus to replace the first API endpoint domain name with a second API endpoint domain name of the region.

15. The apparatus of claim 14, wherein the first API endpoint domain name corresponds to an Internet Protocol (IP) address of an alliance management apparatus in a Domain Name System (DNS).

16. The apparatus of claim 14, wherein the instructions further cause the apparatus to query, based on the first API endpoint domain name, configuration information to obtain the second API endpoint domain name, and wherein the configuration information records a correspondence between the first API endpoint domain name and the second API endpoint domain name.

17. The apparatus of claim 14, wherein the instructions further cause the apparatus to convert, based on a pre-configured domain name rule, the first API endpoint domain name into the second API endpoint domain name.

18. The apparatus of claim 17, wherein the pre-configured domain name rule comprises a correspondence between a first cloud identifier comprised in the first API endpoint domain name and a second cloud identifier comprised in the second API endpoint domain name.

19. The apparatus of computing device system according to claim 11, wherein the instructions further cause the apparatus to:
receive, from the allied cloud, a response corresponding to the processed request; and
forward the response.

20. The apparatus of claim 19, wherein the response comprises information about the cloud service processed in the region.

\* \* \* \* \*

UNITED STATES PATENT AND TRADEMARK OFFICE
CERTIFICATE OF CORRECTION

PATENT NO.         : 11,811,722 B2
APPLICATION NO.    : 17/884039
DATED              : November 7, 2023
INVENTOR(S)        : Jiongjiong Gu et al.

It is certified that error appears in the above-identified patent and that said Letters Patent is hereby corrected as shown below:

In the Claims

Claim 19, Column 48, Lines 62-63: "apparatus of computing device system according to claim" should read "apparatus of claim"

Signed and Sealed this
Second Day of January, 2024

Katherine Kelly Vidal
*Director of the United States Patent and Trademark Office*